(12) United States Patent
Sawada

(10) Patent No.: US 7,774,434 B2
(45) Date of Patent: *Aug. 10, 2010

(54) SUPPORT PROGRAM FOR WEB APPLICATION SERVER AND SERVER

(76) Inventor: Kenichi Sawada, 25-24-305, Shirokane 1-chome, Minato-ku, Tokyo 108-0072 (JP)

( * ) Notice: Subject to any disclaimer, the term of this patent is extended or adjusted under 35 U.S.C. 154(b) by 22 days.

This patent is subject to a terminal disclaimer.

(21) Appl. No.: 12/230,154

(22) Filed: Aug. 25, 2008

(65) Prior Publication Data

US 2009/0013040 A1 Jan. 8, 2009

Related U.S. Application Data

(63) Continuation of application No. 10/538,805, filed as application No. PCT/JP03/16231 on Dec. 18, 2003, now Pat. No. 7,472,165.

(30) Foreign Application Priority Data

Dec. 20, 2002 (JP) ............................. 2002-370953

(51) Int. Cl.
*G06F 15/16* (2006.01)
(52) U.S. Cl. ..................... 709/219; 715/234; 707/708
(58) Field of Classification Search ................. 709/207, 709/229, 219; 726/2, 26; 715/755, 234; 705/50; 707/708

See application file for complete search history.

(56) References Cited

U.S. PATENT DOCUMENTS 5,764,889 A 6/1998 Ault et al.

5,875,296 A 2/1999 Shi et al.
7,124,445 B2* 10/2006 Cronce et al. ............... 726/26
7,219,304 B1* 5/2007 Kraenzel et al. ............ 715/755

(Continued)

FOREIGN PATENT DOCUMENTS

JP A-10-161933 6/1998

(Continued)

OTHER PUBLICATIONS

"Digital Term Dictionary Years 2002-2003 Edition"; third edition; Nikkei Business Publications, Inc. Press Mar. 18, 2002; p. 431.

(Continued)

*Primary Examiner*—Jungwon Chang
(74) *Attorney, Agent, or Firm*—Oliff & Berridge, PLC

(57) ABSTRACT

By using a support program for a web application server according to the present invention, it is possible to completely control an order of executing processes of a processing flow including a transition of a plurality of screens in a web application by a side of the server, and to describe the processing flow as "one unit of executable program code". Also, it is possible to record, point by point, respective items or the like of an entry form included in an HTML document to be sent to a client in the server as a form ledger, compare and verify the respective items with the items in the form ledger at the time of receiving input data corresponding to the entry form from the client, and thereby to automatically discard an unauthorized input or the like without depending upon the application program, by using the support program for the web application server.

2 Claims, 26 Drawing Sheets

U.S. PATENT DOCUMENTS

| | | | |
|---|---|---|---|
| 7,296,077 B2 * | 11/2007 | Harmon et al. | 709/229 |
| 7,441,263 B1 * | 10/2008 | Bakshi et al. | 726/2 |
| 7,472,165 B2 * | 12/2008 | Sawada | 709/207 |
| 7,483,860 B2 * | 1/2009 | Cronce et al. | 705/50 |

FOREIGN PATENT DOCUMENTS

| | | |
|---|---|---|
| JP | A-10-257048 | 9/1998 |
| JP | A-11-232090 | 4/1999 |
| JP | A-2001-154987 | 6/2001 |
| JP | A-2002-236662 | 8/2002 |
| JP | A-2002-334057 | 11/2002 |
| JP | A-2003-044396 | 2/2003 |

OTHER PUBLICATIONS

The Nikkei open System; No. 79; "Part 1—Basic edited, Six subjects which stand, can't solve only by the product"; Nikkei BP; Oct. 15, 1999; pp. 107-110.

The Nikkei open system No. 105, "To Suppress data manipulation which can be easily attacked"; Nikkei BP; Dec. 15, 2001 p. 120 (paragraph—The Overestimate of session ID is taboo.

AppShield: Web Application Security "Product which defends not yet known unfair access"; Open Middleware Report; vol. 19 Hitachi Co.; Apr. 24, 2002; p. 26, figure 1.

The Nikkei open system No. Preceding Technique Literature; "Part 1—Architecture and function It conceals screen transition and DB access, and centers on the development of business logic"; Soliton; Feb. 15, 2002; pp. 110-120.

* cited by examiner

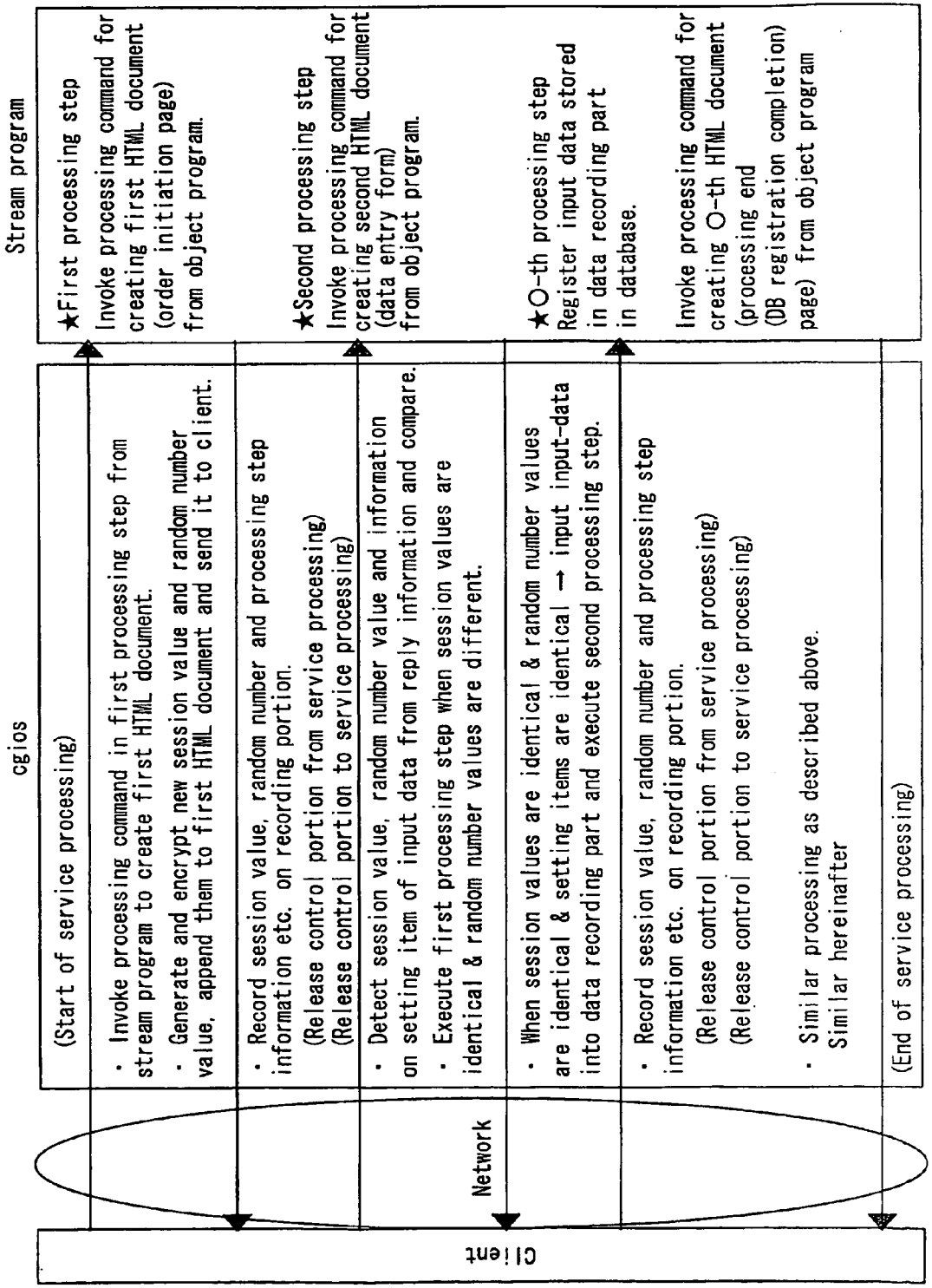

FIG.4

```
ustream input_order($o) { # order entry stream
   top:
      $o = new <APP>::OysterOrder($S);
      $o->default;

first:
      page(input_order.page) {
         $V->{SLOT} = { slot => $o->input };
      }
      if ($V->{action} eq "next") { goto second; }
      goto first;

second:
      if ($o->{ERROR} = $o->check) { goto first; }
      page(print_order_conf.page) {
         $V->{SLOT} = { slot => $o->print };
      }
      if ($V->{action} eq "back") { goto first; }
      elsif ($V->{action} eq "next") { goto third; }
      goto second;

third:
      $o->{orid} = $o->nextorid;
      $$S{DA}->saveObject($o);

fourth:
      page(print_order_done.page) {
         $V->{SLOT} = { slot => $o->print };
      }
      if ($V->{action} eq "next") { goto first; }
      goto fourth;
}
```

FIG. 5

```
# Object that represents order of oyster dish.  Detail of member variable is
<MEMBER>.
package OysterOrder;
# Object that represents order of oyster dish

BEGIN_DECLARE $data = "orid int,                  # Order ID
         brand int,                 # Oyster's brand code
         recipe int,                # Recipe code
         trimming int,              # Seasoning code
         comment text,              # Comment regarding recipe
         primary key(orid)";

$seqs = "seq_orid:orid:1,";

$defo = "brand => OysterType, recipe => RecipeType, trimming => TrimmingType";

END_DECLARE use strict;

sub new { # Constructor of oyster dish ordering object
    my($type,$S,%hash) = @_;
    my %h = ( "S" => $S, "SELF" => "OysterOrder", %hash);
    return bless ¥%h,"<APP>::OysterOrder";
} sub nextorid { # Next ORID
    my($V) = @_; my $S = $V->{S};
    my($orid) = $$S{DA}->getrow('select nextval(''seq_orid'')');
    $orid;
} sub default { # Set default value
    my($V) = @_; my $S = $V->{S};
    $V->{brand} = 1; # Rock oyster
    $V->{recipe} = 1; # Eaten-raw
    $V->{trimming} = 2; # Lemon only
    $V->{comment} = "";
    delete $V->{orid};
}
``` p1, p2, p3, p4

FIG.6

```
sub input { # Order entry form
    my($V) = @_; my $S = $V->{S};
    print_webform( # Order entry form
'<table>
 <ifdef ERROR><span class=error><!ERROR></span></ifdef>
 <tr><td> Brand of oyster</td><td>
   <input type=select name=brand value=$brand choice=[OysterType]></td></tr>
 <tr><td> Recipe of oyster </td><td>
   <input type=select name=recipe value=$recipe choice=[RecipeType]></td></tr>
 <tr><td> Trimmed seasoning</td><td>
   <input type=TrimmingType name=trimming value=$trimming></td></tr>
 <tr><td> Comment</td><td>
   <input type=text name=comment value=$comment size=60></td></tr>
</table>');
}
```
⎫
⎬ p5
⎭

⎫
⎬
⎭

```
sub check {
    my($V) = @_; my $S = $V->{S};
    my $count = 0;
    my $value = $V->{trimming};
    while ($value>0) { $count += $value & 1; $value >>= 1; }
    my $error = "";
    if ($count >= 3) {
        $error = "<li> You can only attach up to two kinds of seasoning at once.";
    }
    $error;
}
```
⎫
⎬ p6
⎭

```
sub print { # Fair copy of order in HTML format
    my($V) = @_; my $S = $V->{S};
    print_webtext( # Fair copy of order in HTML format
'<table>
 <tr><td> Brand of oyster </td><td><%brand></td></tr>
 <tr><td> Recipe of oyster</td><td><%recipe></td></tr>
 <tr><td> Trimmed seasoning</td><td><%trimming></td></tr>
 <tr><td> Comment</td><td><%comment></td></tr>
</table>');
}
```
⎫
⎬ p7
⎭

FIG.7

(a) <Page for inputting order.:/main/input_order.page>

<h3> Please select brand of oyster and recipe</h3>
    <#slot>
    <br>
  <input type=submit action="next" label=" NEXT">

(b) <Page for confirming order.:/main/print_order_conf.page>

<h3> Please confirm your order.</h3>
    <#slot>
    <br>
    <input type=submit action="next" label=" ORDER EXECUTE">
<input type=submit action="back" label=" BACK">

(c) <Page for notifying that order is completed.:/main/print_order_done.page>

<h3> The following order has been accepted.</h3>
    <#slot>
    <br>
<input type=submit action="next" label=" BACK TO BEGINNING">

FIG.16

(a) <Activation stream:/init.stream>
```
ustream init() { # Activation stream
  loop:
    p_fork("Window stream","/main/init.stream","this");
    p_wait();
    goto loop;
}
```

(b) <Window activation stream:/main/init.stream>
```
ustream init() { # Window stream
  loop:
    p_setPage("top.page");
    p_fork("menu","menu.stream","menu");
    p_wait();
    goto loop;
}
```

(c) <Menu stream:/main/menu.stream>
```
ustream menu() { # Menu display stream
  first:
    page(menu.page) {
    }
    if ($V->{action} eq "input_order") {
      p_fork("INPUT ORDER","input_order.stream","^view");
    } elsif ($V->{action} eq "list") {
      p_fork("DISPLAY ORDERING LIST","list.stream","^main");
    }
    goto first;
}
```

FIG.17

(a) \<Top frame (new addition):/main/top.page>
```
<table width=100% height=100% bgcolor=#ffffff border=0 cellspacing=2 cellpadding=0 style="table-layout:fixed">
    <tr>
        <td width=143 valign=top align=left class=wallpaper>
         <div style="overflow:auto"><#menu></div></td>
        <td valign=top class=wallpaper>
         <div style="overflow:auto"><#view></div></td>
    </tr>
    <tr>
        <td colspan=2 height=70% valign=top class=wallpaper>
         <div style="overflow:auto"><#main></div></td>
    </tr>
</table>
```

(b) \<Menu page (new addition):/main/menu.page>
```
<h3> Main menu </h3>
<table><tr><td valign=top>
    <table class=inner bgcolor=#ffffff border-color=#000000 border=2 cellspacing=0 cellpadding=10>
        <tr><td valign=top>
        <li><a href="action:input_order"> INPUT ORDER</a>
        <li><a href="action:list"> DISPLAY ORDERING LIST</a>
        </td></tr>
    </table>
</td></tr></table>
```

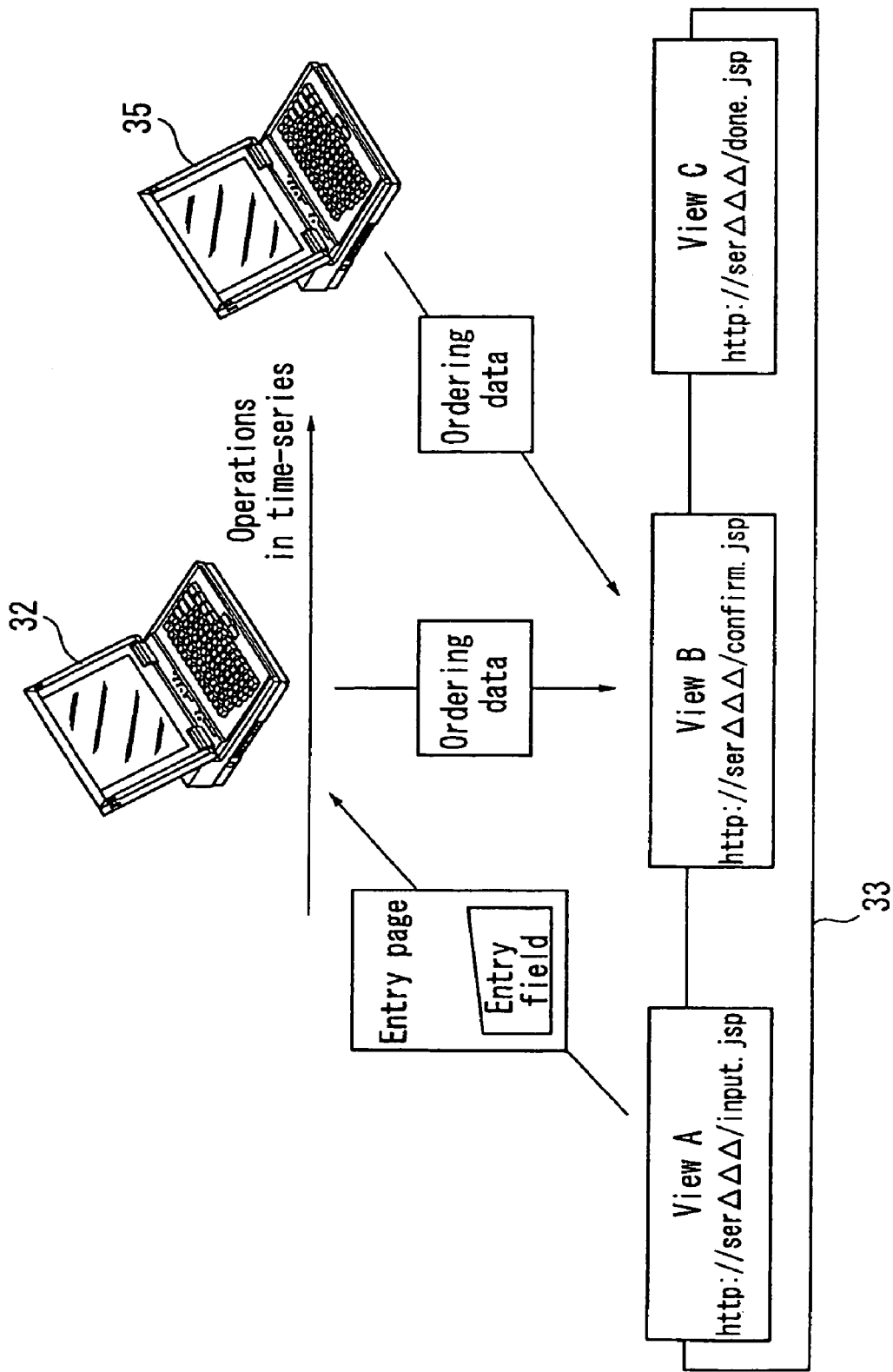

SUPPORT PROGRAM FOR WEB APPLICATION SERVER AND SERVER

This is a Continuation of application Ser. No. 10/538,805 filed Jun. 13, 2005, which is a National Stage of PCT/JP03/16231 filed Dec. 18, 2003, and which claims priority to Japanese Patent Application No. 2002-370953 filed Dec. 20, 2002 in Japan. The disclosure of the prior applications are hereby incorporated by reference herein in their entirety.

TECHNICAL FIELD

The present invention relates to a server which sends web information to a client and receives reply information with respect to the web information from the client to execute a series of processes based on the return information, and a support program used for the server.

BACKGROUND ART

As shown in FIG. 22, when a client requests web information (for example, HTML document) to a web server connected to a network such as the internet, the web server 30 specifies the web information 31 as a requested object with URL and sends it to the client 32 to carry out information provision that corresponds to the request of the client 32.

Nowadays, a web application server 33, which not just only returns the web information 31 according to the request made from the client 32 but also carries out a certain series of processes according to a request from the client 32, has been used many as shown in FIG. 23. The web application server 33 comprises a kind of support program (middleware) that lies between a so-called front end (client 32) and a so-called back end (such as database management system). The support program plays a role of preparing a processing environment necessary for carrying out the series of processes to control flows of various processes effectively. In addition, since the client 32, if it has a browser, can make the web application server 33 to process most of the processes, it has been possible to carry out the processes without depending upon hardware performance of the client 32 by using the web application server 33 (for example, see page 431 of "Digital Term Dictionary Years 2002-2003 Edition", third edition, Mar. 18, 2002, published by Nikkei Business Publications, Inc., edited by Nikkei Business Publications, Inc. Press.).

By the way, a program for generating an HTML document necessary for the series of processes (hereinafter referred to as view) is previously provided in the existing web application server 33. The web application server 33 sequentially generates the HTML document necessary for the processing according to the request for the HTML document made by the client 32, sends it to the client 32, and receives input data inputted based on an entry form of the HTML document from the client 32 to obtain data necessary for the series of processes.

For example, in the web application server 33 that carries out such an order placement process of goods shown in FIG. 24, a view for generating an order entry screen to perform an order entry by the client 32 (hereinafter referred to as "view A"), a view for generating an order confirmation screen to ask the client 32, according to ordering data with respect to an entry form of the order entry screen from the client 32, to confirm the ordering data (hereinafter referred to as "view B"), and a view for generating an order completion screen to display that an ordering process is completed in accordance with order consent data in the order confirmation screen (hereinafter referred to as "view C"), are previously provided.

Once receiving the ordering data or the order consent data from the client 32, the web application server 33 stores contents of ordering (for example, brand, quantity, total amount of money, shipping address, etc.) into a database 34, and carries out a shipment process of goods or the like based on the contents of ordering stored in the database 34.

DISCLOSURE OF INVENTION

Problem to be Solved by the Invention

However, in the web application server 34, since the view A to view C are in a state accessible at any time through the network, the client 32 can access to the view A to view C regardless of a flow of the order placement process. It depends on the request from the client 32 whether the processes in the order placement process shown in FIG. 24 are actually performed or not, according to procedure from the view A to view C.

Therefore, as shown in FIG. 25, although a destination of subsequent request is stored in the view A such that the destination of subsequent request from the client 32 to send an HTML document as a response to the view A becomes the view B, whether or not the destination of request becomes the view B is up to the request of the client 32. Even when it is planned that the view B is sent subsequent to the view A, in some cases, the client 32 may request the view C rather than the view B. Hence, the web application server may be likely to send an HTML document generated by the view C to the client 32, not an HTML document generated by the view B.

In addition, as shown in FIG. 26, when an HTML document of the view B for confirming the order is sent from the client 32 and an HTML document to the effect that the order placement process is completed generated by the view C is then sent and the order placement process is thereby completed, thereafter the client 32 can display a screen of the HTML document of the view B stored in a cache again, by pressing a "Back" button of the browser. Hence, the client 32 may return the order consent data to the web application server 33 again according to the screen of the view B stored in the cache. Thus, there is a problem that the ordering process is performed twice when the order consent data is returned to the web application server 33 again.

Furthermore, as shown in FIG. 27, there is a fear that a client 35 of a malicious third party spoofs the client 32 to send other ordering data before the client 32 returns the ordering data corresponding to the view A to the web application server 33. In such a case, since the conventional web application server 33 cannot judge that the sent ordering data is a reply from which client sent based on which HTML document, there is a case in which the web application server judges the received ordering data as the ordering data sent from the client 32 and proceeds with the order placement process. Accordingly, there has been a problem that it is difficult to carry out a safe order placement process between the client 32 and the web application server 33.

Also, in a general HTML document, since input items to which the client 32 is necessary to input are directly described in each of the views A to C, there has been a problem that, when the input items are increased or decreased by alteration of process or the like, items in each view have to be altered at every view, respectively, and thus a huge amount of work is required in a process of such alteration.

The present invention has been made in view of the above-mentioned problems, and therefore, it is an object of the present invention to provide a server and a support program used for the server. The server grasps processing procedure of a series of processings so that the server and the support program used for the server are capable of avoiding processings which do not correspond to the processing procedure to be carried out, and furthermore, are capable of altering contents of web information used for the series of processings easily, wherein the server sends the web information to a client and receives reply information with respect to the web information from the client to execute the series of processings based on the return information.

Means for Solving the Problem

In order to solve the above-mentioned problems, the present invention is a support program for a web application server, said support program adapted for making a controller for the web application server execute processings (1) to (6) recited below, said controller being adapted to send web information to a client by using a communication means, receive reply information with respect to said web information from said client via the communication means, store the reply information into a storage means and execute, according to processing steps of a series of said processings stored in said storage means, processings based on said reply information: (1) information-adding processing for adding client-specifying information to specify said client and web-specifying information to specify said web information to the web information; (2) information-sending processing for sending said web information to which said client-specifying information and said web-specifying information are added to said client in a specified one of said processing steps by using said communication means; (3) information-storing processing for storing said client-specifying information and said web-specifying information which are added to said web information and processing information related to said specified processing step at the time when said web information is sent to said client, into said storage means every time said web information is sent to said client; (4) information-receiving processing for receiving the reply information returned from said client via said communication means; (5) reply information-detecting processing for detecting whether or not the client-specifying information and the web-specifying information are included in the received reply information; and (6) service-executing processing for obtaining a processing step subsequent to the processing step determined based on said processing information stored in said storage means from said storage means and executing the subsequent processing step when the client-specifying information and the web-specifying information are detected from said reply information and said detected client-specifying information and said web-specifying information are identical with said client-specifying information and said web-specifying information stored in said storage means, respectively, and for executing the processing step determined based on said processing information stored in said storage means again when the client-specifying information and the web-specifying information are detected from said reply information and said detected client-specifying information is identical with said client-specifying information stored in said storage means but said web-specifying information detected from said reply information is different from said web-specifying information stored in said storage means.

Also, it may be configured that said storage means comprises a data-declaration part to be used in said series of the processings as work areas for respective setting items of member variables and a data-storage part for storing data included in said reply information in said series of the processings for the respective setting items, and said support program for the web application server have said controller: discriminate, when a data entry form for having said client to input the data is included in said web information, a kind of a setting item of the input data to be inputted in said data entry form by said data-declaration part and store the kind of the setting item of the input data into said storage means together with said client-specifying information, said web-specifying information and said processing information in said information-storing processing at the time when the web information is sent to said client; and store, when the client-specifying information and the web-specifying information detected from said reply information are identical with said client-specifying information and said web-specifying information stored in said storage means, respectively, and the kind of the setting item of the input data detected from said reply information is identical with the kind of setting item of the input data stored in said storage means, said detected input data into said data-storage part for the respective setting items in said service-executing processing.

Furthermore, it may be configured that, when a plurality of said data entry forms are included in said web information and when the kinds of the setting item of the input data to be inputted according to said data entry form overlap, said support program for the web application server have said controller: execute identifier-adding processing for adding an identifier for carrying out identification of the input data in which the kinds of the setting item overlap to every said data entry form and including the data entry forms in said web information, and at the same time, associate the kinds of the setting item of the input data inputted by said data entry forms with said identifiers and store the kinds of the setting item into said storage means in said information-storing processing; and discriminate, when the client-specifying information and the web-specifying information detected from said reply information are identical with said client-specifying information and said web-specifying information stored in said storage means, respectively, and the kinds of the setting item of said input data detected from said reply information and the kinds of the setting item stored in said storage means correspond at every identical identifier, the setting items of said detected input data based on the identifiers stored in said storage means and store them into said data-storage part for the respective setting items in said service-executing processing.

In addition, the present invention is a support program for a web application server, said support program adapted for making a controller for the web application server execute processings (1) to (6) recited below, said controller being adapted to send web information in which a data entry form for having a client to input data is included to said client by using a communication unit, receive the input data inputted according to said data entry form from said client as reply information via the communication unit, and store said input data into a storage unit comprising a data-declaration part used as work areas for respective setting items of member variables and a data-storage part for storing the data included in said reply information for the respective setting items: (1) information-adding processing for adding the data entry form for having said client to input the data to the web information; (2) information-sending processing for sending said web information to which said data entry form is added to said client by using said communication means; (3) information-storing processing for discriminating a kind of a setting item of the input data to be inputted in said data entry form by said data-declaration part stored in said storage means and storing the kind of the setting item of the input data into said storage means every time said web information is sent to said client;

(4) information-receiving processing for receiving the reply information returned from said client via said communication means; (5) reply information-detecting processing for detecting whether or not said input data is included in the received reply information; and (6) service-executing processing for, when said input data is detected from said reply information and the kind of the setting item of the detected input data and the kind of the setting item stored in said storage means are identical, storing said detected input data into said data-storage part for the respective setting items.

In the support program for the web application server, it may be configured that, when a plurality of said data entry forms are included in said web information and when the kinds of the setting item of the input data to be inputted according to said data entry form overlap, said support program for the web application server have said controller: execute identifier-adding processing for adding an identifier for carrying out identification of the input data in which the kinds of the setting item overlap to every said data entry form and including the data entry forms in said web information, and at the same time, associate the kinds of the setting item of the input data inputted by said data entry forms with said identifiers and store the kinds of the setting item into said storage means in said information-storing processing; and discriminate, when the kinds of the setting item of said input data detected from said reply information and the kinds of the setting item stored in said storage means correspond at every identical identifier, the setting items of said detected input data based on the identifiers stored in said storage means and store them into said data-storage part for the respective setting items in said service-executing processing.

More preferably, in the aforementioned support program for the web application server, it may be configured that a parallel processing is implemented in said web application server by: saving information necessary to carry out said information-receiving processing in said storage means to have said controller to execute other processing after said information-storing processing; and restoring said saved information to have said controller to resume said reply information-detecting processing when receiving said reply information in said information-receiving processing.

Also, it may be a web application program comprising a function implemented by the aforementioned support program for the web application server. Moreover, it may be an operating system comprising a function implemented by the support program for the web application server.

Furthermore, the present invention is a server in which a controller sends web information to a client by using a communication means, receives reply information with respect to said web information from said client via the communication means, stores the reply information into a storage means and executes processings based on said reply information according to processing steps of a series of said processings stored in said storage means, characterized in that said controller executes: information-adding processing for adding client-specifying information to specify said client and web-specifying information to specify said web information to the web information; information-sending processing for sending said web information to which said client-specifying information and said web-specifying information are added to said client in a specified one of said processing steps by using said communication means; information-storing processing for storing said client-specifying information and said web-specifying information which are added to said web information and processing information related to said specified processing step at the time when said web information is sent to said client, into said storage means every time said web information is sent to said client; information-receiving processing for receiving the reply information returned from said client via said communication means; reply information-detecting processing for detecting whether or not the client-specifying information and the web-specifying information are included in the received reply information; and service-executing processing for obtaining a processing step subsequent to the processing step determined based on said processing information stored in said storage means from said storage means and executing the subsequent processing step when the client-specifying information and the web-specifying information are detected from said reply information and said detected client-specifying information and said web-specifying information are identical with said client-specifying information and said web-specifying information stored in said storage means, respectively, and for executing the processing step determined based on said processing information stored in said storage means again when the client-specifying information and the web-specifying information are detected from said reply information and said detected client-specifying information is identical with said client-specifying information stored in said storage means but said web-specifying information detected from said reply information is different from said web-specifying information stored in said storage means.

In addition, it may be configured that said storage means comprises a data-declaration part to be used in said series of the processings as work areas for respective setting items of member variables and a data-storage part for storing data included in said reply information in said series of the processings for the respective setting items, and said controller: discriminates, when a data entry form for having said client to input the data is included in said web information, a kind of a setting item of the input data to be inputted in said data entry form by said data-declaration part and stores the kind of the setting item of the input data into said storage means together with said client-specifying information, said web-specifying information and said processing information in said information-storing processing at the time when the web information is sent to said client; and stores, when the client-specifying information and the web-specifying information detected from said reply information are identical with said client-specifying information and said web-specifying information stored in said storage means, respectively, and the kind of the setting item of the input data detected from said reply information is identical with the kind of the setting item of the input data stored in said storage means, said detected input data into said data-storage part for the respective setting items in said service-executing processing.

Furthermore, it may be configured that, when a plurality of said data entry forms are included in said web information and when the kinds of the setting item of the input data to be inputted according to said data entry form overlap, said controller: executes identifier-adding processing for adding an identifier for carrying out identification of the input data in which the kinds of the setting item overlap to every said data entry form and including the data entry forms in said web information, and at the same time, associates the kinds of the setting item of the input data inputted by said data entry forms with said identifiers and stores the kinds of the setting items into said storage means in said information-storing processing; and discriminates, when the client-specifying information and the web-specifying information detected from said reply information are identical with said client-specifying information and said web-specifying information stored in said storage means, respectively, and the kinds of the setting item of said input data detected from said reply information and the kinds of the setting item stored in said storage means correspond at every identical identifier, the setting items of said detected input data based on the identifiers stored in said storage means and stores them into said data-storage part for the respective setting items in said service-executing processing.

In addition, the present invention is a server having a controller which sends web information in which a data entry form for having a client to input data is included to said client by using a communication means, receives the input data inputted according to said data entry form from said client as reply information via the communication means, and stores said input data into a storage means comprising a data-declaration part used as work areas of respective setting items of member variables and a data-storage part for storing the data included in said reply information for the respective setting items, characterized in that said controller executes: information-adding processing for adding the data entry form for having said client to input the data to the web information; information-sending processing for sending said web information to which said data entry form is added to said client by using said communication means; information-storing processing for discriminating a kind of a setting item of the input data to be inputted by said data entry form by said data-declaration part stored in said storage means and storing the kind of the setting item of the input data into said storage means every time said web information is sent to said client; information-receiving processing for receiving the reply information returned from said client via said communication means; reply information-detecting processing for detecting whether or not said input data are included in the received reply information; and service-executing processing for, when said input data is detected from said reply information and the kind of the setting item of the detected input data and the kind of the setting item stored in said storage means are identical, storing said detected input data into said data-storage part for the respective setting items.

In the aforementioned server, it may be configured that, when a plurality of said data entry forms are included in said web information and when the kinds of the setting item of the input data to be inputted according to said data entry form overlap, said controller: executes identifier-adding processing for adding an identifier for carrying out identification of the input data in which the kinds of the setting item overlap to every said data entry form and including the data entry forms in said web information, and at the same time, associates the kinds of the setting item of the input data inputted by said data entry forms with said identifiers and stores the kinds of the setting item into said storage means in said information-storing processing; and discriminates, when the kinds of the setting item of said input data detected from said reply information and the kinds of the setting item stored in said storage means correspond at every identical identifier, the setting items of said detected input data based on the identifiers stored in said storage means and stores them into said data-storage part for the respective setting items in said service-executing processing.

Effect of the Invention

As described in the foregoing, by using the present invention, it is possible to execute the series of the processings executed by the server while confirming circumstances of processing of its processing steps by the server.

Also, in the present invention, the controller judges whether or not the kind of the setting item of the input data included in the reply information corresponds to the kind of the setting item, which is possible to input in the entry form of the sent web information, and thereby, when the setting item of the input data and the stored setting item correspond, that input data can be associated with the data-declaration part and automatically stored into the data-storage part. Hence, it is possible to avoid the unexpected input data to be stored into the data-storage part as the reply information from the client and used in subsequent processing.

Moreover, since it is possible to have the controller to retrieve (restore) necessary data stored in the storage unit and to carry out necessary processing only at the time of sending the web information and receiving the reply information, the controller is possible to easily implement a multitasking environment in which a plurality of series of processings are executed concurrently.

BRIEF DESCRIPTION OF DRAWINGS

FIG. 3 is a data flow diagram showing a relation of sending and receiving of data between the server and a client according to the present invention.

FIG. 4 is a diagram showing a program list of a stream program indicating processing procedure in an ordering process of an oyster dish.

FIG. 5 is a first diagram showing a program list of a class definition program used for the ordering process of the oyster dish.

FIG. 6 is a second diagram showing the program list of the class definition program used for the ordering process of the oyster dish.

FIG. 7 is a diagram showing data definitions of HTML documents used for the ordering process of the oyster dish.

FIG. 16 is a diagram showing program lists of stream programs for creating the HTML document having the three windows.

FIG. 17 is a diagram showing page definitions used for creating the HTML document having the three windows.

FIG. 27 is a diagram showing a case in which a client of a third party sends ordering data to the web application server.

BEST MODE FOR CARRYING OUT THE INVENTION

Hereinafter, an embodiment of the present invention will be described by using drawings.

Figure 1:
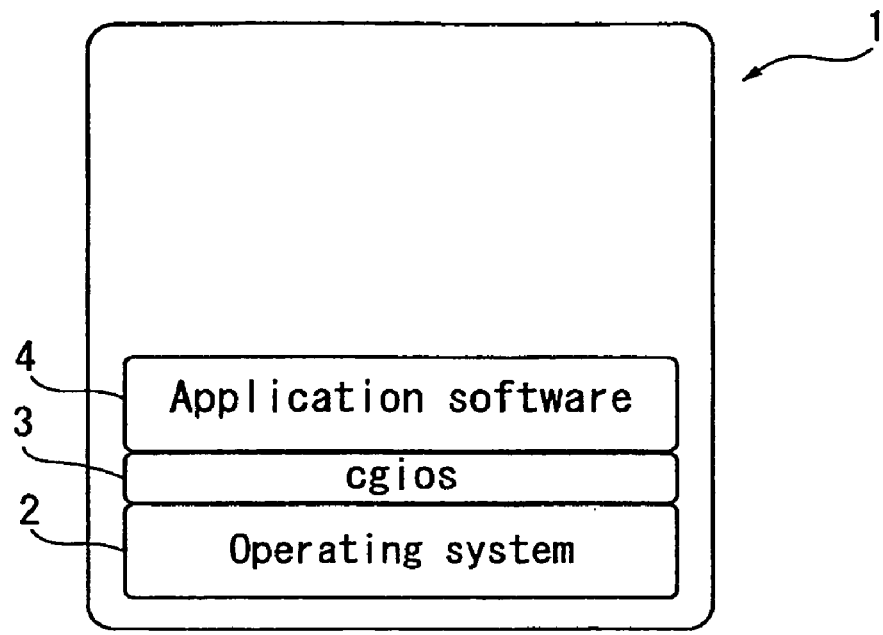
FIG. 1 is a block diagram showing a software structure of a server according to the present invention.

FIG. 1 is a block diagram showing a software structure of a web application server according to the present invention. The server 1 is structured by an OS (operating system) 2 such as Windows (registered trademark) or Linux, cgios 3 which operates on the OS 2 and an application software 4 executed based on the cgios 3.

Cgios 3 is a middleware for executing the application software 4 described for the cgios, and functions as an emulator for operating the application software 4 on the OS 2 as a conventional OS. In addition, since the cgios 3 includes functions specific to the cgios that will be described later in addition to a function as an application for a web server and a CGI (Common Gateway Interface) function, it also has a function as a support software for the web application server (support program for web application server). By using the cgios 3, since the cgios 3 automatically executes a process implemented in the cgios 3 without a need of a programmer to directly describe the process in a program for the application software 4, it is possible to achieve reduction of an amount of work in creating programs.

Figure 2:
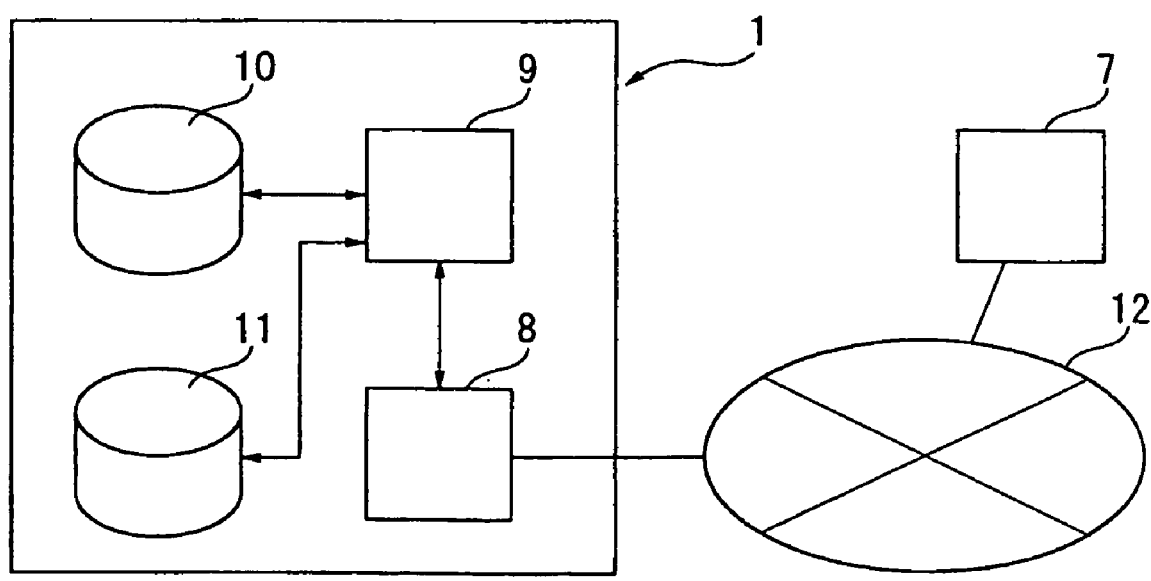
FIG. 2 is a block diagram showing a hardware structure of the server according to the present invention.

FIG. 2 is a block diagram showing an outline of a hardware structure of the server 1. The server 1 is provided with a send/receive portion 8 for carrying out sending and receiving of various data (information) with a client 7, a controller 9 comprising a CPU, and a storage portion 10 and a database 11 which comprise a hard disk.

The client 7 is a communication equipment provided with a browser such as a personal computer, a PDA (Personal Digital Assistance) or a cellular phone. The send/receive portion 8 is structured by a NIC (Network Interface Card) or the like. By using the send/receive portion 8, the server 1 is possible to carry out the sending and receiving of the data with the client 7 through a network 12. The network 12 may be an open network such as the internet unveiled to outside or a network such as LAN not unveiled to outside. Meanwhile, although only one client 7 is connected with the network 12 in FIG. 2, a plurality of clients may be connected thereto.

The application software 4 described in a programming language for the cgios 3 is recorded in the storage portion 10. The application software 4 is created by compiling a stream program and a class definition program. The server 1 executes a series of counter processes (processes of a back end side with respect to a front end related to an interface) such as reception processing for accepting an order of goods from the client for example, based on the application software 4.

Here, an overall flow of the counter processes is described in the stream program, and concrete processes in each step of the counter processes are described in the class definition program. The stream program invokes the class definition to execute the counter processes. In addition, the cgios 3 has a function to manage a member variable used in the class definition program for every instance (represents an instance generally used in an object-oriented program technology. A class represents a style of an object, while the instance represents an entity of the object) of the class definition program. Since the cgios carries out control such that a member variable according to an instance of a certain class definition program sent toward the client 7 is returned to the member variable of that instance when the reply is given (an instance that issues a member variable and an instance absorbing the member variable are the same), it is not necessary to describe the member variable in the stream program as a direct argument when the stream program invokes a processing command described in the class definition program. Therefore, in the stream program, even when the processing commands to be invoked belong to different classes, or even when they belong to the same class, it is possible to show processing procedure without being influenced by the member variables in the classes.

In addition, processing step information for showing a step of process in the counter processes, and a session value (client-specifying information) and a random number value (web-specifying information), which are described hereinafter, are stored (saved) in the storage portion 10. Here, the processing step information is, in more concrete terms, information in which an address value of a program counter, referred by the controller 9 when it performs processes, is stored. Furthermore, the storage portion 10 is provided with a data-storage part for, at the time when data is inputted from the client 7 in the counter processes, dividedly storing the input data as setting items for every instance related to a process at that time.

Input data that is in a process in the counter processes is inputted into the database 11. The database 11 is different from the data-storage part, which temporarily saves the input data inputted in the counter processes, in this regard. The setting item stored in the database 11 is synchronized with a setting item of the member variable declared in the class definition program, and when the setting item is altered in the class definition program, the cgios 3 automatically alters the synchronized setting item.

The controller 9 is a CPU of a computer structuring the server 1 for, besides carrying out various processes according to the application software 4, executing processes for implementing the functions specific to the cgios 3 according to instructions of a kernel (a portion which implements a basic function of the cgios). Hereinafter, the functions specific to the cgios 3 implemented by the controller 9 based on the instructions of the cgios 3 will be described.

FIG. 3 is a data flow diagram showing a relation of sending and receiving of an HTML document (web information) sent from the server 1 to the client 7 and reply information returned from the client 7 to the server 1.

When the client 7 requests an HTML document of a transaction initiation page (a request to access to URL of the transaction initiation page), the controller 9 generates the session value and the random number value. Here, the session value is a value used for identifying the series of counter processes carried out by the server 1 for the specific client 7. The controller 9 uses the session value to specify contents of the counter processes and to specify the client 7. Also, the random number value is used for specifying the HTML document sent by the server 1 to the client 7. Meanwhile, although the random number value is used for specifying the HTML document in the present embodiment, it is not limited to the random number value as long as there is a function as identification information capable of specifying the HTML document. In addition, the server 1 invokes a processing command in a first processing step described in the stream program from the class definition program to generate an HTML document used for the first processing step (hereinafter referred to as a first HTML document).

Thereafter, the controller 9 encrypts the generated session value and the random number value, adds the encrypted session value and the random number value to the first HTML document by using a HIDDEN parameter of HTML, and sends it from the send/receive portion to the client 7. In addition, simultaneously with the sending of the first HTML document, the controller 9 stores (saves) the session value, the random number value and the processing step information into the storage portion 10, and further, when an entry form for having the client 7 to input data is provided in the first HTML document, it stores information on setting item, which is possible to input by the entry form, for every instance. Thereafter, the controller 9 is released from the counter processes.

When the client 7 receives the first HTML document sent by the server 1, the first HTML document is displayed on a web browser screen of the client 7. The client 7 is possible to input data (input data) according to the entry form of the first HTML document. After carrying out an inputting process, the client makes the request to access to the URL of the transaction initiation page again and at the same time, returns the input data to which the inputting process is carried out, the encrypted session value and the random number value to the server 1 as the reply information by clicking a button such as "NEXT". Meanwhile, since the cgios 3 of the server 1 specifies the client and the HTML document based on the session value and the random number value, URL to which the request to access from the client 7 to the server 1 is made is only the URL of the transaction initiation page. In this regard, the server 1 differs from a conventional web application server which specifies a different URL, as a destination of the request to access, for every contents of process of the counter processes.

When the reply information is returned to send/receive portion 8 of the server 1, the controller 9 resumes the series of counter processes. The controller 9 detects whether or not the encrypted session value and the random number value are included in the reply information, and when the session value and the random number value are not included, judges that the received reply information is information replied independently of the HTML document sent by the server 1.

When the encrypted session value and the random number value are detected from the reply information, the controller 9 extracts and decrypts the encrypted session value and the random number value, and retrieves the session value and the random number value stored in the storage portion 10 to compare the decrypted session value and the random number value with the session value and the random value stored in the storage portion 10. The controller 9 judges that the client to which the HTML document is sent and the client from which the reply information is returned are identical when the decrypted session value and the session value stored in the storage portion 10 are identical. On the other hand, when the compared session values are different, the controller 9 discards the received reply information by judging that the client is different.

When the compared session values are identical, the controller 9 further judges whether or not the decrypted random number value and the random number value stored into the storage portion 10 when the first HTML document is sent are identical. When the random number values are identical, the controller judges that the input data in which the client 7 has inputted according to the entry form of the first HTML document is returned as the reply information, and when the random number values are different, judges that it is reply information to a process based on an HTML document different from the first HTML document.

When the controller 9 has judged that the received reply information is the reply information which is based on the entry form of the first HTML document by comparing the session values and the random number values, the controller compares the information on setting items of every instance in the class definition programs stored in the storage portion 10 with the information on setting items of the input data of every instance in the reply information, classifies the input data which coincide with the setting items stored in the storage portion 10 into every setting item used in its instance, and stores the classified input data into the data-storage part. As just described, by storing the input data inputted by the client 7 in the data-storage part for every setting item of the member variable of the instance used for the class definition program, the input data of every instance stored in the data-storage part is utilized in a subsequent process as an existing value of every setting item in a case where the stream program invokes the processing commands described in the class definition program in a subsequent processing step. The input data that does not coincide with the setting item stored in the storage portion 10 is discarded. Later, the controller 9 judges up to which of the processing steps has the process finished in the series of counter processes shown in the stream program according to the processing step information stored in the storage portion 10, and carries out a processing step subsequent to the judged processing step, i.e. a process of a second processing step.

In the second processing step, the controller 9 generates an HTML document used in the second processing step (hereinafter referred to as a second HTML document) by executing a processing command invoked in the second processing step of the stream program. Thereafter, the controller 9 generates other random number value to specify that it is the second HTML document, and encrypts it together with the session value generated in the first processing step, and adds them to the second HTML document.

The controller 9 sends the second HTML document to the client 7 through the send/receive portion 8, and furthermore, simultaneously with the sending of the second HTML document, stores (saves) the session value, the random number value, the processing step information, and information setting item of every class definition program used in an entry form of the second HTML document into the storage portion 10, and repeats processes similar to those explained in the first processing step.

Since it is possible to judge that the client 7 has not returned the reply information with respect to the first HTML document in a case where the encrypted session value and the random number value are included in the returned reply information, and the encrypted session value and the session value stored in the storage portion 10 are identical but the random number values are different, a process specified from the processing step information stored in the storage portion 10 is repeated again and executed. When the process is repeated again and executed, the controller 9 discards the received reply information, creates the first HTML document again, encrypts the aforementioned session value and a new random number value for specifying the newly created first HTML document, and add them to the first HTML document. Thereafter, the controller 9 sends the first HTML document to the client 7 again through the send/receive portion 10. When sending the first HTML document again, the controller 9 alters only the random number value stored in the storage portion 10, and stores (saves) various information such as the session value, the processing step information and so on into the storage portion 10, again.

The controller 9 repeats the aforementioned processes and sequentially executes the processing steps stored in the stream program, and then carries out a process of registering input data which is updated and stored on the data-storage part of the storage portion 10 at the end of a series of process, on the database 11 as the data determined in the series of counter processes. Thereafter, the controller creates an HTML document to the effect that the counter process is finished, and sends it to the client 7 to end the process.

Next, a method of sending and receiving of the data between the server 1 and the client 7 will be described concretely by using a simple stream program and a class definition program.

FIG. 4 to FIG. 7 are program lists showing executing programs in an ordering process of an oyster dish, wherein FIG. 4 is a stream program, FIGS. 5 and 6 are a class definition program related to an order of the oyster dish, and FIG. 7 is programs showing page definitions of HTML documents created according to the stream program shown in FIG. 4.

The ordering process of the oyster dish is basically completed by five processing steps. A step 1 is a processing step for carrying out a declaration of a class to be used and carrying out initial value setting of setting items used in a created instance.

Figure 8:
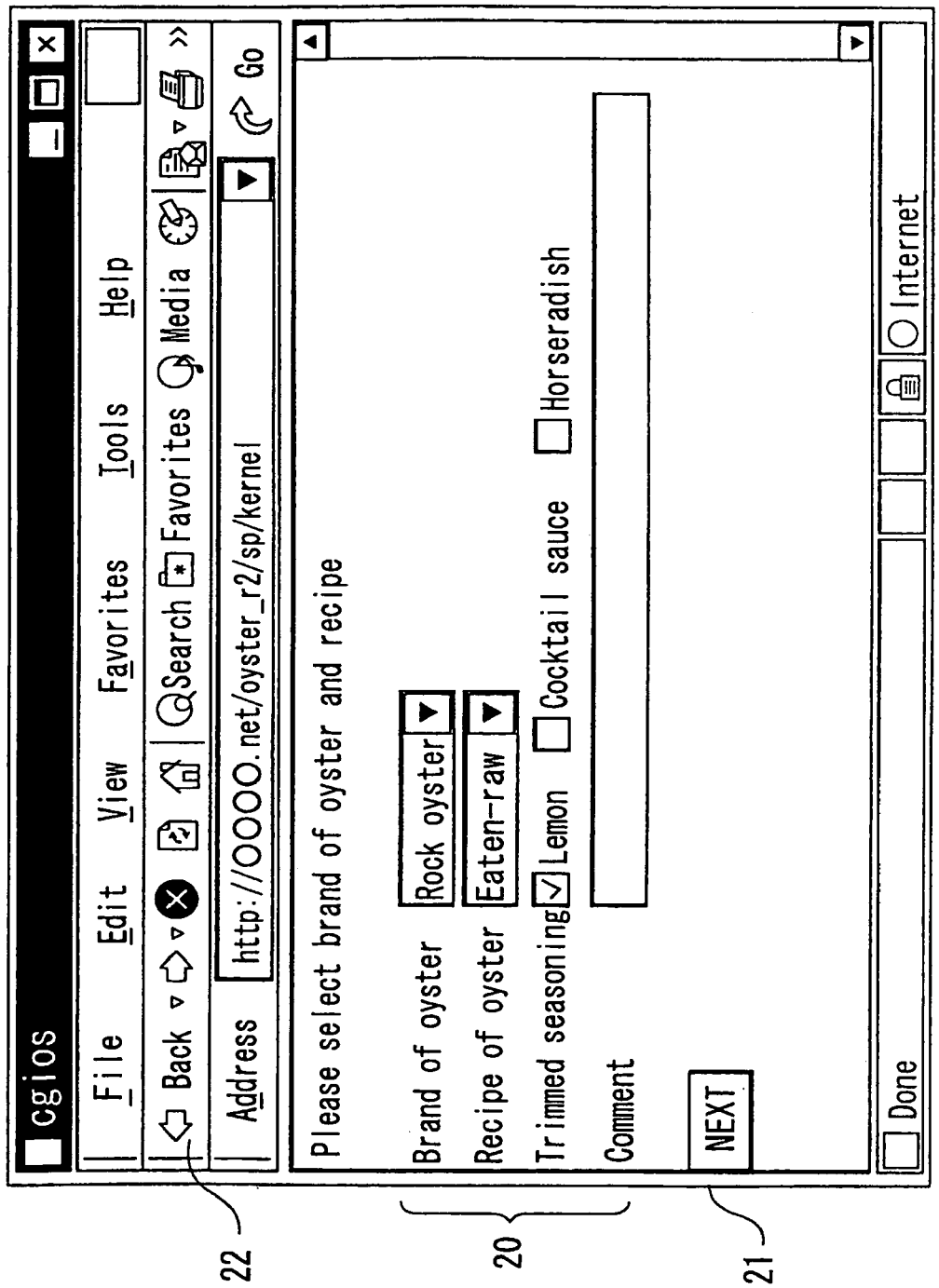
FIG. 8 is a first diagram showing a display screen of an HTML document used in a step 2 of the ordering process of the oyster dish.
Figure 9:
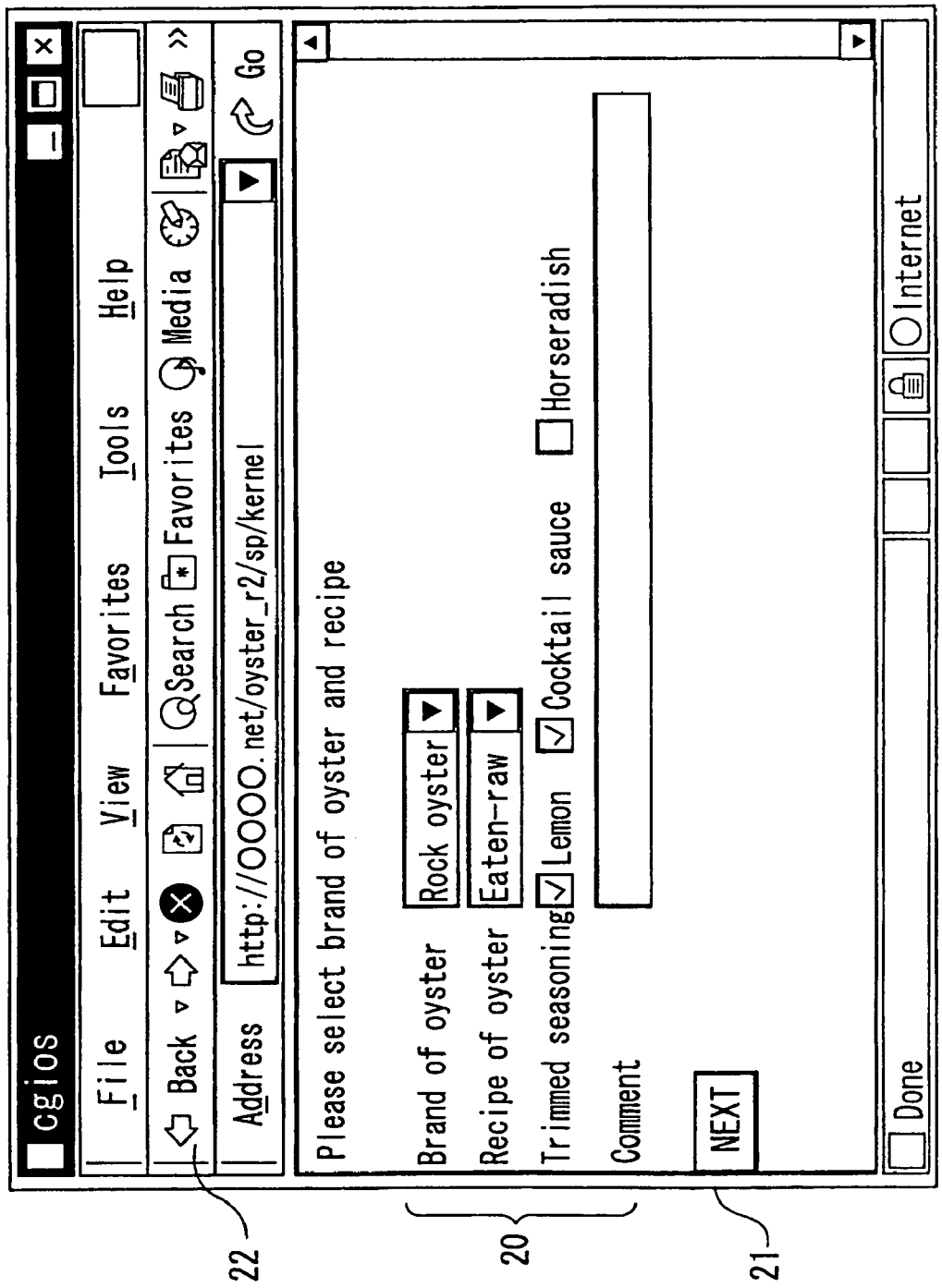
FIG. 9 is a second diagram showing the display screen of the HTML document used in the step 2 of the ordering process of the oyster dish.

A step 2 is a processing step for asking the client to enter data of three kinds of setting item of brand of oyster, recipe and trimmed seasoning and to enter a comment, and in order to carry out this process, an HTML document of an order entry screen (hereinafter referred to as page A1) is sent from the server 1 to the client 7. FIG. 8 and FIG. 9 show screen displays corresponding to the page A1.

Figure 10:
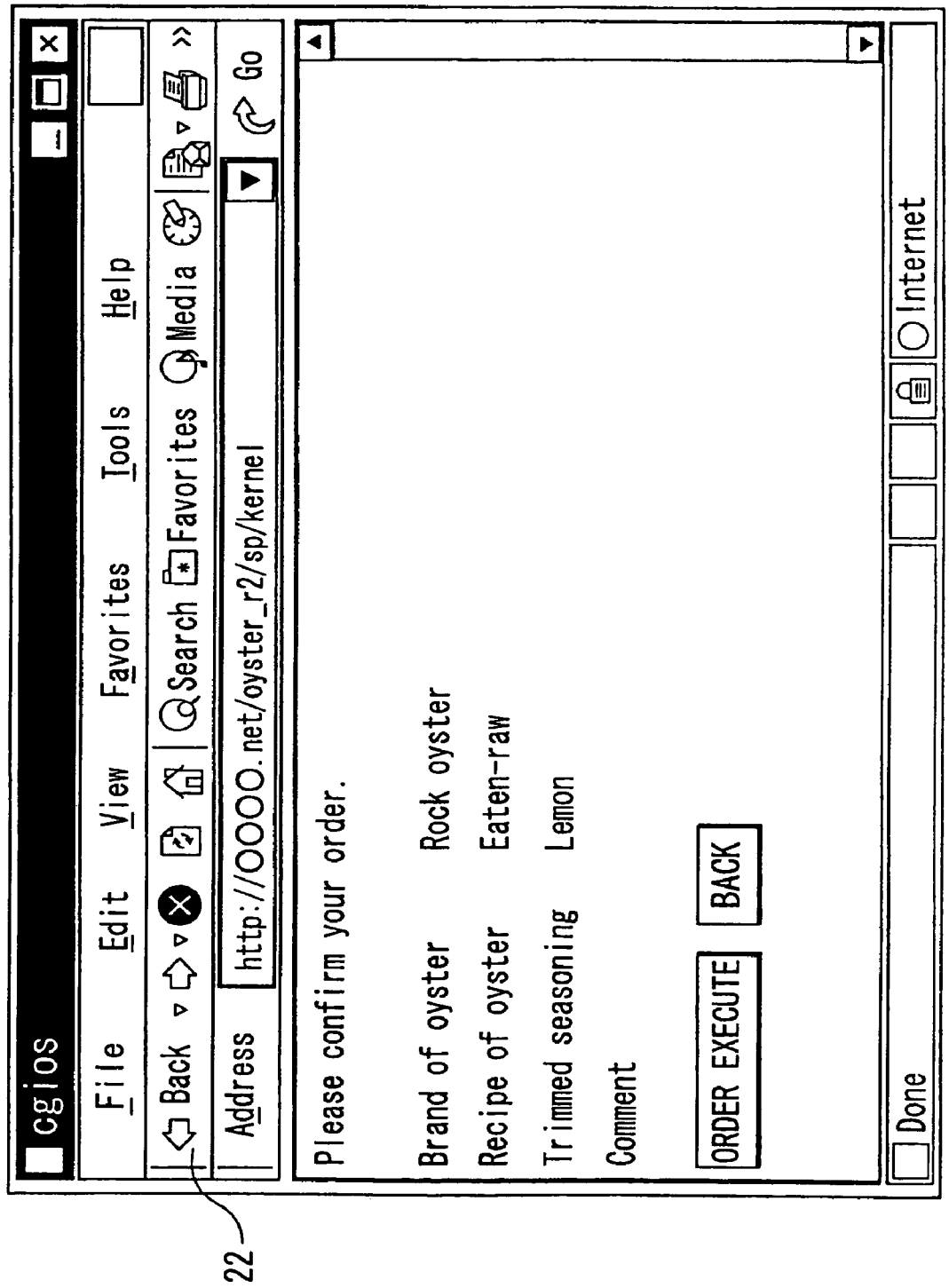
FIG. 10 is a first diagram showing a display screen of an HTML document used in a step 3 of the ordering process of the oyster dish.
Figure 11:
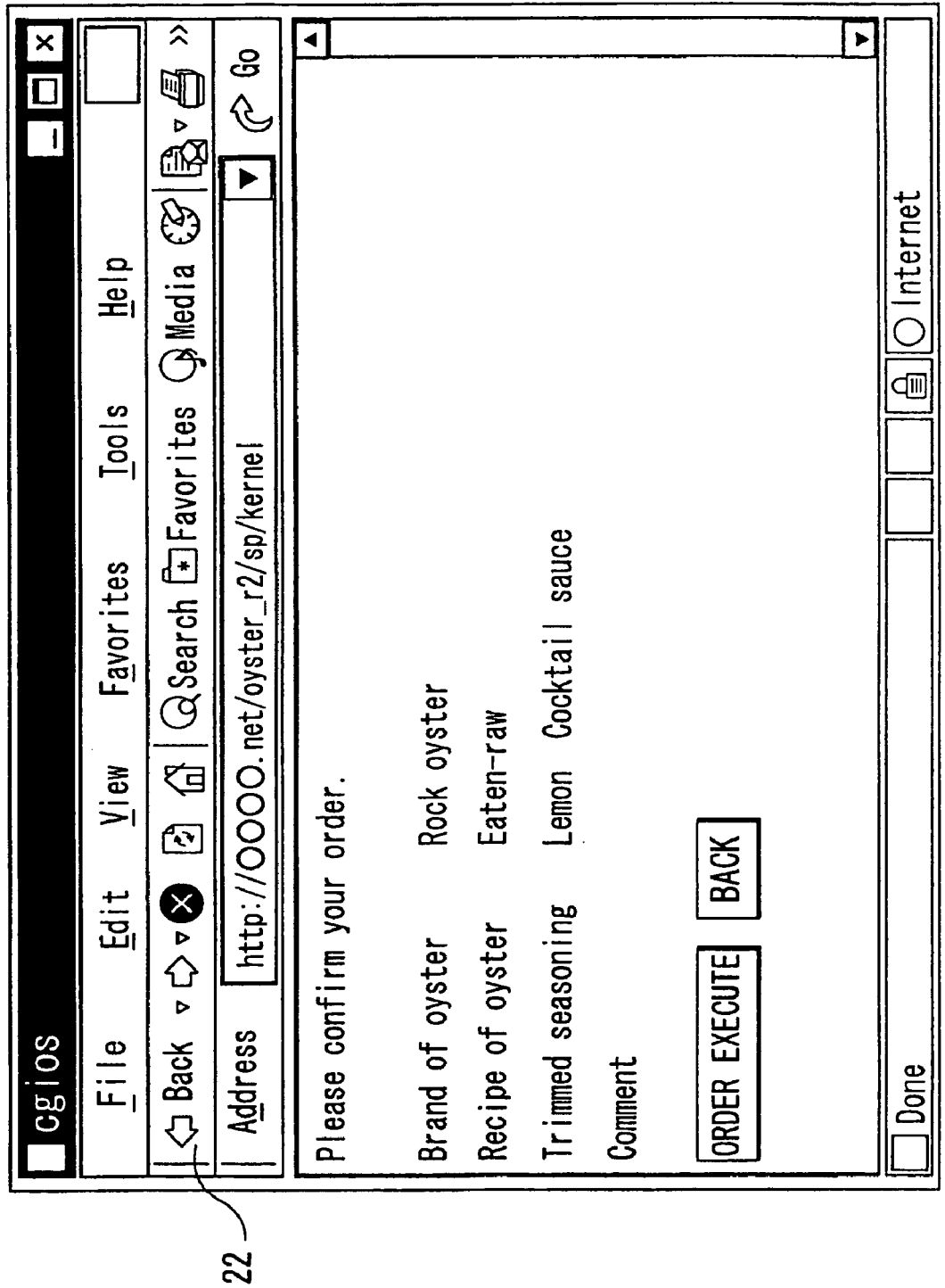
FIG. 11 is a second diagram showing the display screen of the HTML document used in the step 3 of the ordering process of the oyster dish.
Figure 12:
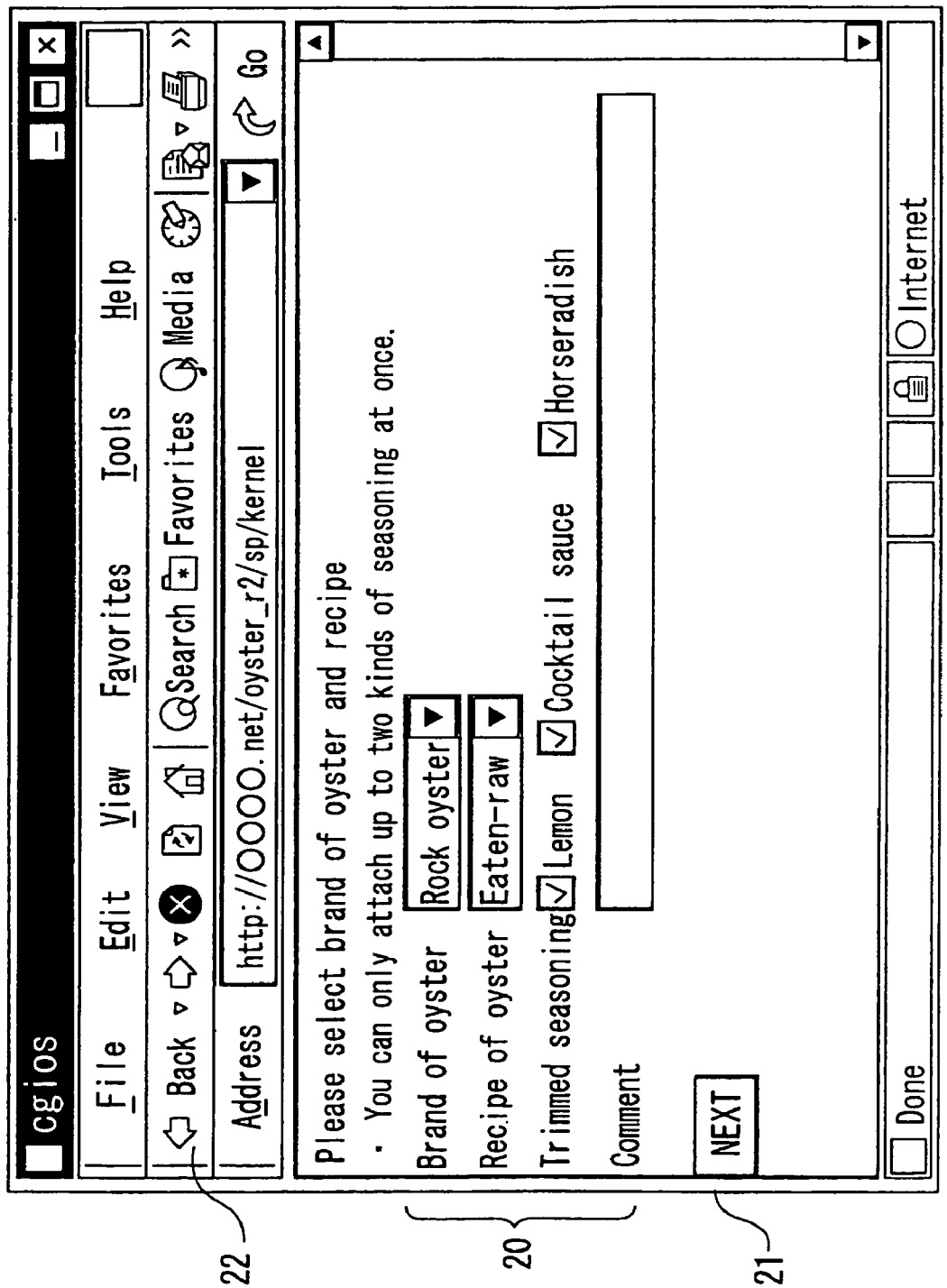
FIG. 12 is a diagram showing a display screen in which display of error regarding kind of seasoning is performed in the ordering process of the oyster dish.

A step 3 is a processing step for asking the client to confirm the brand of oyster, the recipe, the trimmed seasoning and contents of the comment entered by the client 7. In order to carry out this process, an HTML document of an order confirmation screen (hereinafter referred to as page B1) for displaying and confirming contents of ordering entered by the client 7 in the step 1 is sent from the server 1 to the client 7. FIG. 10 and FIG. 11 show screen displays corresponding to the page B1. Meanwhile, in the step 3, an error process for checking whether or not the kinds of seasoning entered by the client 7 are less than two kinds is executed. When they are more than three kinds, an error message such as shown in FIG. 12 is displayed on the screen.

A step 4 is a processing step for storing setting value information on which confirmation of ordering is done into the database 11.

Figure 13:
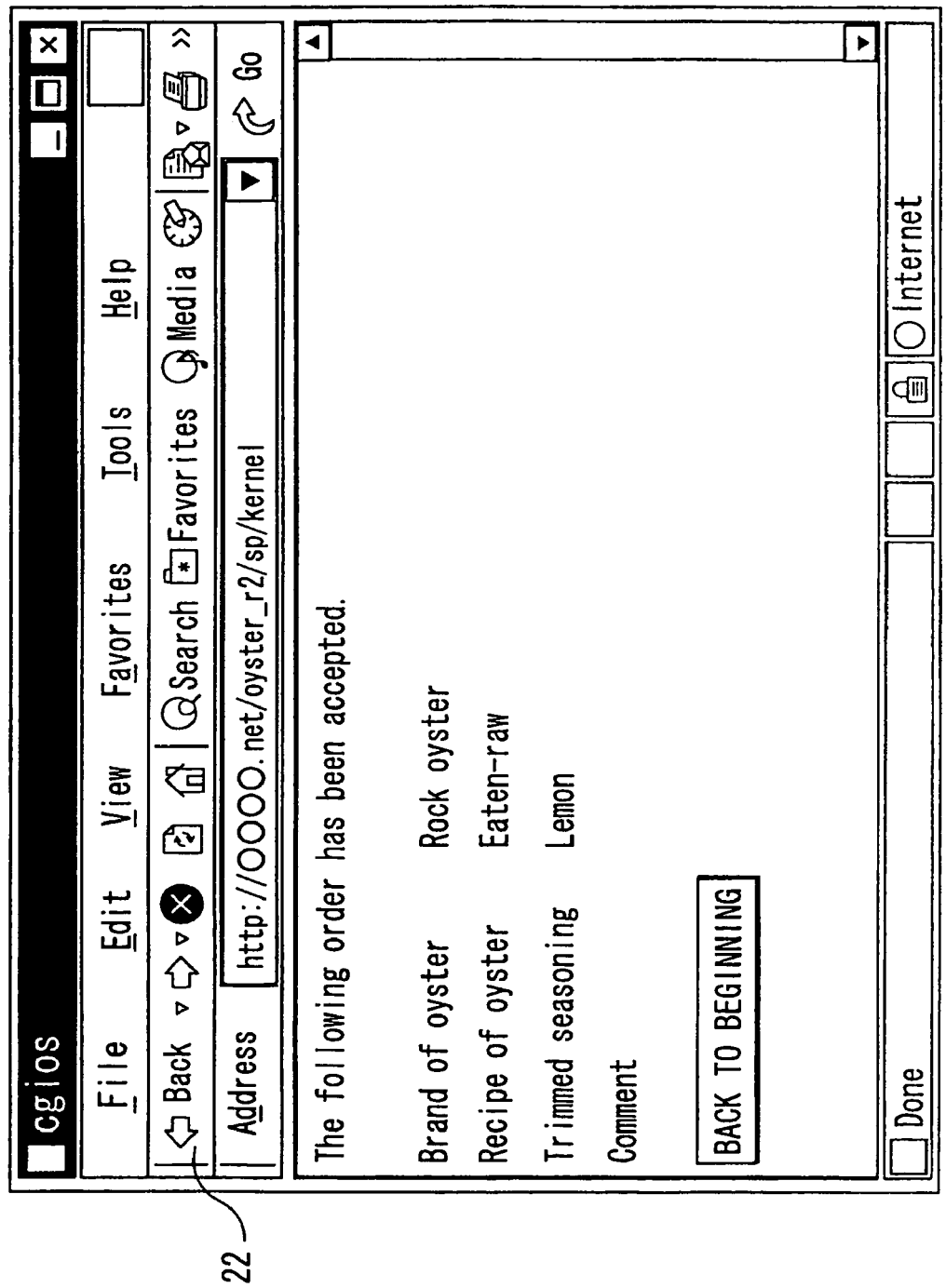
FIG. 13 is a diagram showing a display screen of an HTML document used in a step 5 of the ordering process of the oyster dish.

A step 5 is a processing step to inform that the order of the oyster dish is accepted according to the contents confirmed in the step 3. In order to carry out this process, an HTML document of an order completion screen (hereinafter referred to as page C1) for displaying the contents of ordering confirmed in the step 3 and displaying that the ordering process is completed is sent from the server 1 to the client 7. FIG. 13 is a screen display corresponding to the page C1.

Also, the program shown in FIG. 7(*a*) represents the page definition for creating the HTML document of the page A1, the program shown in (*b*) represents the page definition for creating the HTML document of the page B1, and the program shown in (*c*) represents the page definition for creating the HTML document of the page C1. The programs shown in FIG. 7(*a*) to (*c*) are described in HTML (Hypertext Markup Language), and from "<h3>" to "</h3>" is a tag for displaying a header on the display screen of the HTML document. In addition, "<input type=submit action="next" label="NEXT">" is a tag for displaying a button written "NEXT", and when this button is clicked by the client 7, a return value of "next" is returned to the server 1 as the reply information. "<#slot>" indicates that its contents of display vary according to a processing command of a class definition program called in a predetermined processing step of the stream program.

The class definition program shown in FIGS. 5 and 6 will be described. This class definition program is a class definition program in which a declaration of the member variable of every setting item used for the order of oyster dish and processing commands processed by using information on the setting item are assembled, and information necessary at the time of carrying out the processes related to the order of oyster dish are aggregated. In the class definition program shown in FIGS. 5 and 6, a class of OysterOrder is defined as shown by package OysterOrder;

The class definition program is structured by a data-declaration part p1 of the setting items shown by a section sandwiched between #BEGIN#DECLARE and #END#DECLARE, and processing command parts p2 to p7 shown by sub ~{~~}.

The declaration of the member variable for every setting item corresponding to the database 11 is carried out in the data-declaration part p1. A member variable declaration of a signed integer type for inputting an order ID, a code for representing a brand of oyster, a code representing a recipe and a seasoning code, and a member variable declaration for text entry to input a comment with regard to the recipe, are carried out therein. When the class definition program is compiled, the setting items corresponding to the declared member variables are created on the database every time the class definition program is compiled. Accordingly, when the setting item of the member variable is altered in the class definition program, the setting item in the database 11 is also altered automatically at the time of compilation of the class definition program.

The processing command part p2 is a processing command for generating an instance by reserving a storage area for every setting item used in the class at the data-storage part of the storage portion 10.

The processing command part p3 is a processing command for generating a sequence number used at the time of registering the input data stored in the data-storage part in the database 11. By executing this processing command, it is possible to avoid data already registered to be overwritten when the data is to be registered in the database 11.

The processing command part p4 is a processing command for carrying out initialization of the setting items used for the instance. When this processing command is invoked and executed in the stream program, a setting value of 1 representing "rock oyster" is assigned to a member variable {brand} of the instance for inputting the brand code of the oyster's brand, a setting value of 1 representing "eaten-raw" is assigned to a member variable {recipe} for inputting the recipe code, a setting value of 2 representing "lemon-only" is assigned to a member variable {trimming} for inputting the seasoning code, and a member variable {comment} for inputting the comment on recipe is set in blank.

The processing command part p5 is a processing command for generating the order entry form provided in the page A1. When this processing command is invoked and executed by the stream program, such an HTML document (page A1) shown in FIG. 8 is created. In accordance with instructions of the cgios 3, the controller 9 associates the setting items, into which the client 7 is possible to input data according to the created page A1, with the instance invoked at the time of creating the page A1 and stores the setting items into the storage portion 10. When the client 7 carries out setting of input data 20 such as type of oyster's brand on the basis of the page A1 and then clicks the button 21 of "NEXT" on the screen, the reply information is sent to the server 1. In the server 1 to which the reply information is sent, the controller 9 judges whether or not the setting items of the input data included in the reply information correspond to the setting items stored in the storage portion 10. When there are corresponding setting items, the input data of every setting item stored in the data-storage part of the storage portion 10 is automatically updated to the input data included in the reply information, and the input data included in the reply information is discarded when they do not correspond.

The processing command part p6 is a processing command for displaying the error message on the page A1, in a case where the input data of the setting item related to the seasoning code is included in the reply information, the setting item related to the seasoning code is also stored in the storage portion 10, and both setting items coincide but a data value of the input code is not an allowable data value, which is a case when three kinds of seasoning code are selected simultaneously for example.

The processing command part p7 is a processing command for creating order confirmation items displayed on the page B1 and order completion items displayed on the page C1. Since display of the header displayed at an uppermost part of the screen and kind of button displayed at a lowermost part of the screen only differ between the page B1 and the page C1 and display items comprising the brand of oyster, the recipe, the seasoning and the comment are the same, it is used at the time when creating the HTML documents of both the order confirmation screen in the step 2 and the order completion screen in the step 4.

Explanation for the stream program will be given next. The stream program is a program in which the flow of the series of counter processes is described by invoking the processing commands described in the class definition program. It is possible to record an order of executing processes in the web application as "one unit of executable program code" by using the stream program.

The stream program shown in FIG. 4 is structured by five processing steps of "top", "first", "second", "third" and "fourth", and information on these processing steps is stored into the storage portion 10 as the processing step information.

First, in "ustream input_order ($o) [# order entry stream ~~]", it is explained that the stream program is an order entry stream, and it is declared that a class used in the order entry stream is only one instance shown by $o.

A processing command of "new" (the processing command part p2) is executed by

"top: $o=new <APP>::OysterOrder ($S);", thereby the storage area for the class shown by OysterOrder is reserved and the instance shown by $o is generated in the storage area. Furthermore, a processing command "default" (the processing command part p4) is executed by "$o-> default;", thereby the initial value setting of the setting items of the instance shown by $o is carried out.

Meanwhile, although only one instance $o is used in the stream program, it is also possible to declare a plurality of instances, for example, $o1 and $o2 when carrying out the series of processes with a plurality of instances, by using the same class as shown by stream input_order ($o1, $o2) [# order entry stream top:
    $o1=new <APP>::Oysterorder ($S);
    $o1·> default;
    $o2=new <APP>::Oysterorder ($S);
    $o2·> default;

In the subsequent step of "first", the page A1 shown in FIG. 8 is created by utilizing the page definition shown in FIG. 7(a). Here, since it is described as "$V->[SLOT]=[slot =>$o-> input];", the order entry form created by a processing command of input (the processing command part p5) of the instance $o is displayed at a portion of the tag of "<#slot>" in FIG. 7(a) in such a manner as to be embedded thereat. Although not described in the program of the processing step of "first", the session value and the random number are encrypted and added to the page A1 created by the processing step of first, and furthermore, the session value, the random number value and the processing step information (it is information to the effect that the current processing step is "first") are stored in the storage portion 10, and the information on setting items used in the processing command of "input", more specifically, the information on four setting items of the brand of oyster, the recipe of oyster, the trimmed seasoning and the comment, are associated with the instance $o and stored. Also, when the button 21 of "NEXT" shown in FIG. 8 is clicked in the page A1, because of:

if ($V->[action] eq "next") [goto second;]
goto first;

the process of the controller 9 is moved to the subsequent processing step of "second" in the stream program.

Meanwhile, although the process of the controller 9 is moved to the processing step of "second" when the "NEXT" button 21 of the page A1 is clicked, as already explained, the controller 9 obtains the reply information from the client 7 to carry out the extracting/comparing processes of the session value, the random number value and the information on setting items in the input data, before the process is moved. The controller 9 discards the reply information in the case where the session value and the random number value are not detected from the reply information and in the case where the session values do not coincide. Also, in the case where the detected session value and the session value stored in the storage portion 10 are identical but the detected random number value and the random number value stored in the storage portion 10 differ, it is possible to judge that the client 7 has pressed the "Back" button 22 of the browser or the like to display an old HTML document stored in a cache and thereafter, the reply information is returned based on the old HTML document. In the case where it is judged that the reply information is returned based on the old HTML document, the controller 9 executes the process of the processing step of "first" again, and when the detected session value and the random number value coincide with the session value and the random number value stored in the storage portion 10 respectively, the setting items of the input data inputted by the client 7 are detected from the reply information to update and store the setting items in the data-storage part with the corresponding input data. With regard to input data of an item which does not correspond thereto, that data is discarded and thereafter, the process is moved to the subsequent processing step of "second".

In the subsequent processing step of "second", the controller 9 checks whether or not there is an error with regard to the contents of the reply information.

A process of a processing command of "check" (the processing command part p6) of the instance $o is executed by
if ($o->[ERROR]=$o-> check) [goto first;], and when three kinds of seasoning are selected by the client 7, it is returned to the processing step of "first" to display an error display as shown in FIG. 12.

When only one kind of seasoning is selected in the processing step of second as shown in FIG. 8, the page definition shown in FIG. 7(b) is utilized to create the page B1 shown in FIG. 10. Also, as shown in FIG. 9, the page B1 shown in FIG. 11 is created when less than two kinds of seasoning are selected.

A process of a processing command of "print" (the processing command part p7) of the instance $o is executed when creating the page B1, and the input data of the page A1 returned from the client 7 to the server 1 as the reply information in the processing step of first is displayed. Unlike the page A1, an "ORDER EXECUTE" button and a "BACK" button are displayed in the page B1. Here, the process is moved on to the "third" as a subsequent processing step when the "ORDER EXECUTE" button is clicked, and the process is returned to the process of first as the previous processing step when the "BACK" button is clicked.

In the subsequent processing step of third, a processing command of "nextorid" (the processing command part p3) is executed to assign the sequence number to the member variable {orid} used for the instance $o, and by "$$S[DA]->saveObject($o);", the input data of every setting item of the instance $o is stored in the database 11 by defining the member variable {orid} to which the sequence number is inputted as a primary key.

Later, the processing step is moved on to the "fourth" to create the page C1 shown in FIG. 13 by utilizing the page definition shown in FIG. 7(c). Although the general ordering process of the oyster dish finishes by the processing step of "fourth", it is possible to repeatedly carry out the process of the processing step of "first" again by clicking a "BACK TO BEGINNING" button displayed on the view C1.

As described in the foregoing, according to the server 1 of the present invention, it is possible to execute the series of counter processes executed by the server 1 while confirming circumstances of process of its processing steps by the server 1. Accordingly, as compared with the conventional web application server in which whether a series of counter processes is carried out according to procedure or not is entrusted to the client 7, the server 1 according to the present invention is possible to control the contents of display of the HTML document sent to the server 7 such that the series of counter processes is executed according to the procedure of process. Hence, it is possible to proceed with the counter processes at the discretion of a side of the server 1 to avoid an unexpected transition of process to be occurred.

Also, since specifying of the client and storing of the input data included in the reply information and so on are executed with a certainty by mere necessity for a programmer who creates executing programs to create the stream program, and are executed without describing processes of specifying the client and confirming the reply information for the respective processing steps and so on on the program, the amount of work in creating programs is reduced and processes for modification and alteration of the programs are facilitated.

Furthermore, according to the server 1 of the present invention, the controller 9 is possible to judge based on the instructions of the cgios 3 whether the kinds of setting items of the input data included in the reply information correspond to the kinds of setting items, which is possible to be inputted by the entry form of the sent HTML document, or not, and is possible to discard the input data when the setting items of the input data and the stored setting items differ, and to associate the input data with the instance to automatically store the input data into the data-storage part of the storage portion 10 when they correspond. Therefore, in the server 1 according to the present invention, it is possible to avoid unexpected input data to be stored as the reply information from the client 7 and used in a subsequent process.

Also, since the programmer does not have to define a process of carrying out judgment on whether or not the input data included in the reply information is appropriate data in a program, it is possible to further reduce the amount of work in creating the programs and facilitate improvement in stability of the server 1.

Moreover, since it is possible to have the controller 9 to retrieve (restore) the necessary data stored in the storage portion 10 and to carry out the necessary process only at the time of sending the HTML document and receiving the reply information, the controller 9 is possible to easily implement a multitasking process utilizing a plurality of stream programs.

In addition, since the member variable of every setting item used in the series of counter processes and the processing commands utilizing the setting items are assembled for every class definition program and the member variable is not described in other class definition program nor in the stream program, it is only required in a case of altering a member variable used in the series of counter processes to alter contents of declaration of the member variable within the class definition program. For this reason, it is possible to carry out modification on specification easily only by altering the setting items of the member variables and the processing commands described in the class definition program without altering other class definition programs and the stream programs and so on, so that it is possible to establish a system having an abundance of flexibility. Especially, the cgios 3 manages the member variable of the class for every setting item of each instance even when a plurality of instances generated from the same class in the same stream program are used in the cgios 3. Therefore, even when the setting items of the member variables used in the stream overlap, the programmer is possible to create the stream program without clarifying their differences on the program.

Figure 14:
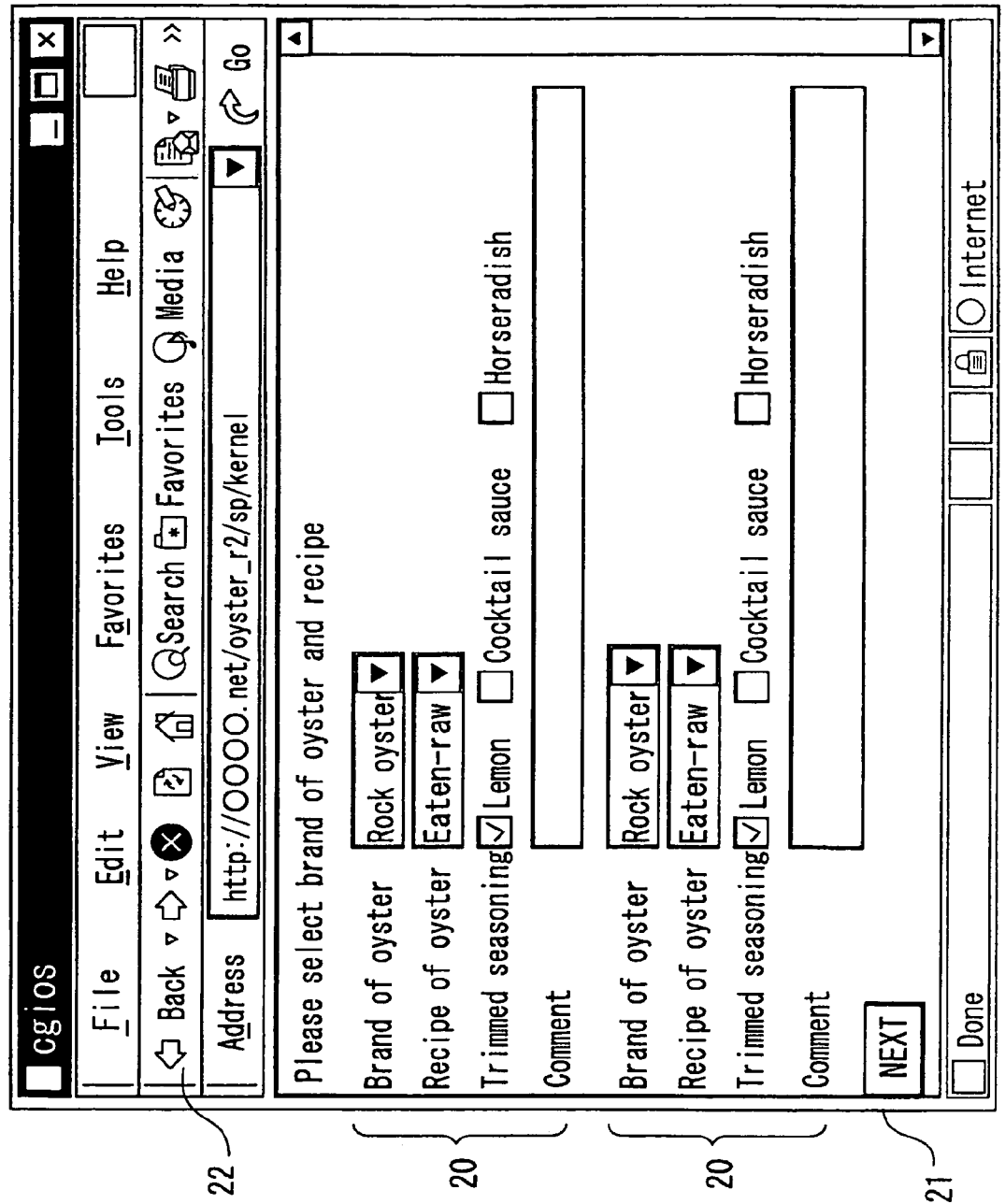
FIG. 14 is a diagram showing a display screen of an HTML document in which two sets of items of brand of oyster, recipe of oyster, trimmed seasoning and comment are shown in the ordering process of the oyster dish.

For example, as shown in FIG. 14, when creating a page D in which two sets of items of brand of oyster, recipe of oyster, trimmed seasoning and comment are displayed on one screen, two instances of $o1 and $o2 are declared to respectively discriminate the data of each setting item of the member variable used in the OysterOrder class by using identifiers comprising the $o1 and $o2 and store them separately. When sending the view D to the client 7, the setting items (brand of oyster, recipe of oyster, trimmed seasoning and comment) of the instance $o1 and the setting items (brand of oyster, recipe of oyster, trimmed seasoning and comment) of the instance $o2 in the entry form are discriminated and are stored into the storage portion 10. As well as in the case of detecting the input data from the reply information, the setting items of the input data (brand of oyster, recipe of oyster, trimmed seasoning and comment) of the instance $o1 and the setting items of the input data (brand of oyster, recipe of oyster, trimmed seasoning and comment) of the instance $o2 are extracted discriminately, and are respectively stored into the data-storage part as separate input data.

Figure 19:
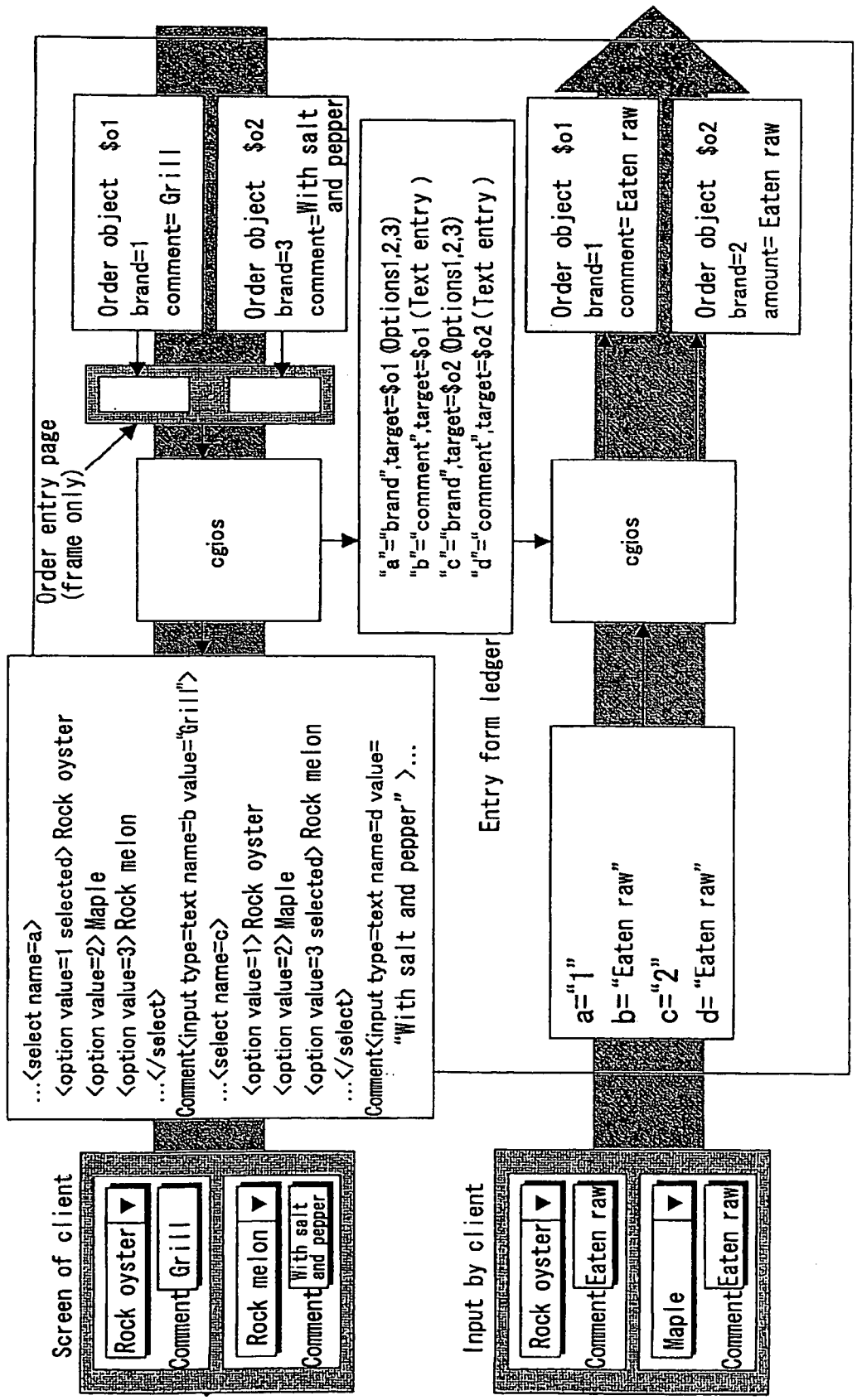
FIG. 19 is a diagram schematically showing a process of classifying a plurality of sets of setting items comprising brand of oyster and comment by using identifiers and storing them into a storage portion, extracting the setting items of input data corresponding to the respective identifiers from reply information and storing them respectively into a data-storage part.

Now, aforementioned process will be described concretely by using FIG. 19, only focusing on a field of "brand of oyster" and a field of "commend" among the setting items of the entry form shown in FIG. 14. As shown in FIG. 19, the controller 9 of the server 1, by using the cgios 3, discriminates each pair of the setting items of "brand of oyster" and "comment", respectively, by using the two identifiers $o1 and $o2, assigns an uniquely discriminated serial number (for example, "a", "b", "c" . . . ) to each setting item and store them into the storage portion 10. The controller 9 stores data "a" in a select format which is data related to the brand of oyster and selected from numeric values of 1 to 3, and data "b" which is data related to the comment and is data in a text format, as the setting items of the instance $o1, into the storage portion 10 as an entry form ledger. Likewise, as the setting items of the instance $o2, the controller 9 stores data "c" in the select format which is data related to the brand of oyster and selected from the numeric values of 1 to 3, and data "e" which is data related to the comment and is data in the text format, into the storage portion 10 as an entry form ledger.

Thereafter, the controller 9 creates the HTML document containing two entry forms 20 and sends it to the client 7. When the reply information corresponding to the entry forms is returned from the client 7, the controller 9 judges whether or not the setting items of the reply information correspond to the setting items of the entry form ledger stored in the storage portion 10. When they correspond, the controller 9 judges that the data "a" included in the reply information is the data related to "brand of oyster" of the instance $o1, the data "b" is the data related to "comment" of the instance $o1, the data "c" is the data related to "brand of oyster" of the instance $o2, and the data "d" is the data related to "comment" of the instance $o2, and stores each of the data into the data-storage part.

As described above, even when creating the entry form comprising the overlapping setting items by the HTML document, it is possible to have the cgios to automatically classify each of the setting items by providing one processing command which corresponds to each of the setting items and creating the plurality of instances using the same class, and it is possible to carry out modification on specification of a display format of the entry form and the setting items and the like easily by merely altering only the processing command of the class definition program. Furthermore, since a member variable used in a class definition program does not depend on other class definition programs nor the stream programs and so on, even when the setting item or the like of the class definition programs are altered, it is possible to reduce occurrence of an error in the entire system attributable to its alteration.

Meanwhile, since the cgios 3 carries out structuring of program by combining the stream programs representing the flow of the series of counter processes with the class definition programs in which the member variables of the instance used in the stream programs and the processing commands which use the member variables are assembled, it is possible to create the entry form, which was difficult by a traditional creating technique of the HTML document, easily. For example, when creating a list of ordered data in the HTML document, since it is possible to paste the list in the HTML document in such a manner as to insert the list in the HTML document by creating an outer frame of the list, header, various setting items and the like with a particular output format by the processing command of the instance and invoking the created list in the stream program, it is possible to easily create such a list that each line has an entry form. Furthermore, since it is also possible to call other stream programs from the stream program, it is also possible to call a list creating stream for creating the list in the stream program which shows the above-mentioned ordering process of the oyster dish, invoke a processing command for creating the list from the instance in the list creating stream to create the list, and return the process to the stream of the ordering process of oyster dish after creating the list. Moreover, by applying the method of creating the list, it is also possible to output data to Microsoft excel (registered trademark) in a list format other than the list in the HTML document.

Also, it is possible to perform window management in a web page by the server 1, by utilizing the method of calling other stream programs in the stream program and the page definition of creating the HTML document. In a conventional web application, basically, only one process is executable in one web page, and it is general to use a frame function of the browser used by the client 7 to carry out a plurality of processes. However, since operation of the frame function of the browser is basically entrusted to discretion of the client 7, there has been a case in which window display of a format which the server 1 intends is not realized. Since the cgios 3 is possible to decide the window display format from the page definition of the HTML document, execute the stream programs individually in each of the windows, and paste the HTML documents outputted as results of execution of each of the stream programs in the corresponding windows to create one web page, it is possible to carry out the window management without depending upon the frame function of the browser.

Furthermore, since it is possible to retrieve (restore) and store (save) the data stored in the storage portion 10 according to the process of each of the stream programs executed in every window, it is possible to easily realize the multitasking process utilizing the multi-window.

Now, a method of creating such an HTML document having three windows shown in FIG. 15 by the cgios 3 will be described by using stream programs shown in FIG. 16 and page definitions shown in FIG. 17. First, by an activation stream program shown in FIG. 16(a), a window activation stream program shown in FIG. 16(b) is executed on a web page ("this" of p_fork ("", "//", "this") of the activation stream program shows that effect) in which setting of a window is not done, and waiting of a process of the activation stream program is carried out by p_wait ( ).

Figure 15:
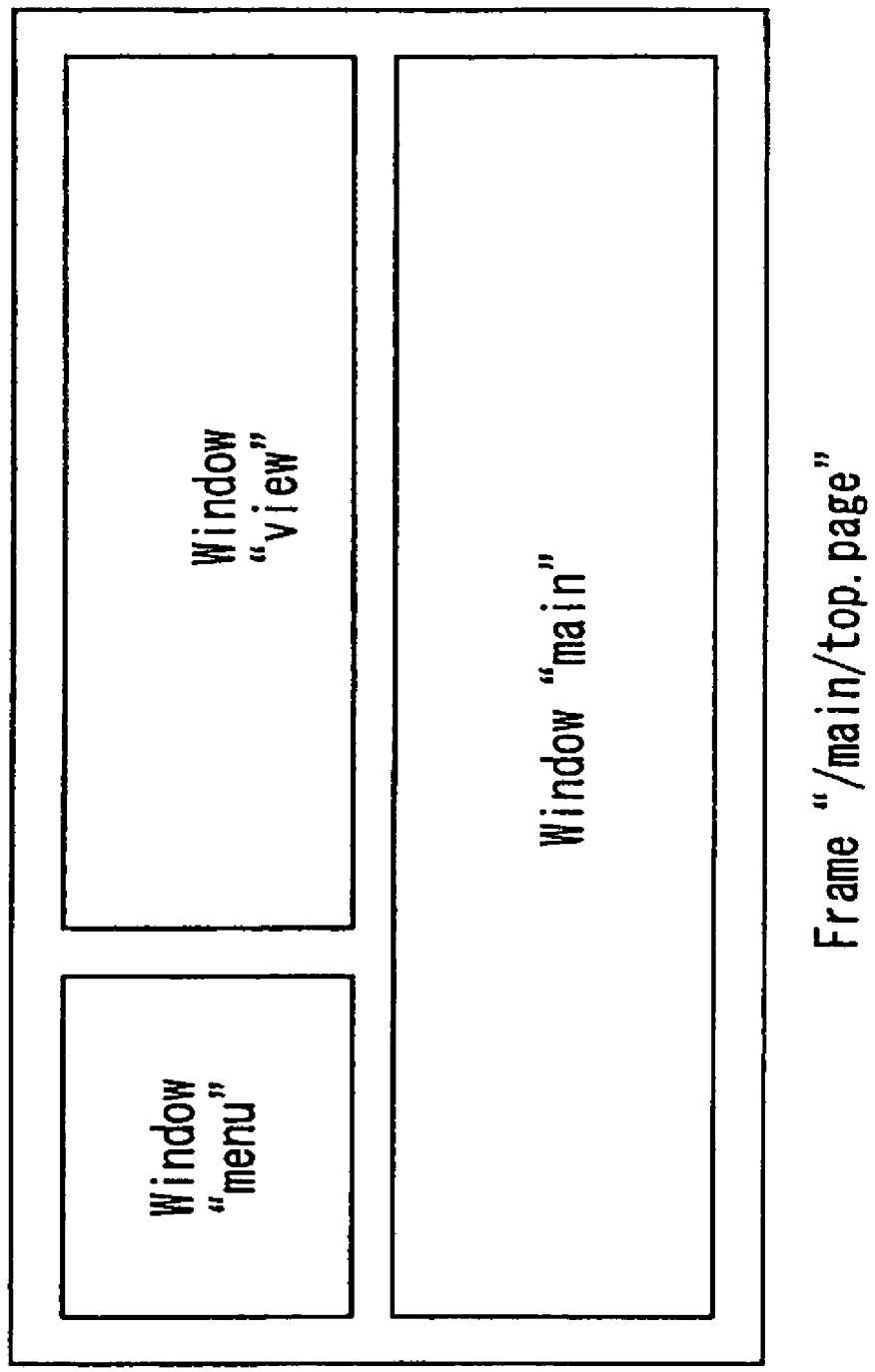
FIG. 15 is a diagram showing an outline of a display screen of an HTML document having three windows.

When the window activation stream program is executed in the activation stream program, such three windows shown in FIG. 15, in which a page definition shown in FIG. 17(a) is used, are formed. A menu stream program shown in FIG. 16(c) is executed in the "menu" section of these windows.

Figure 18:
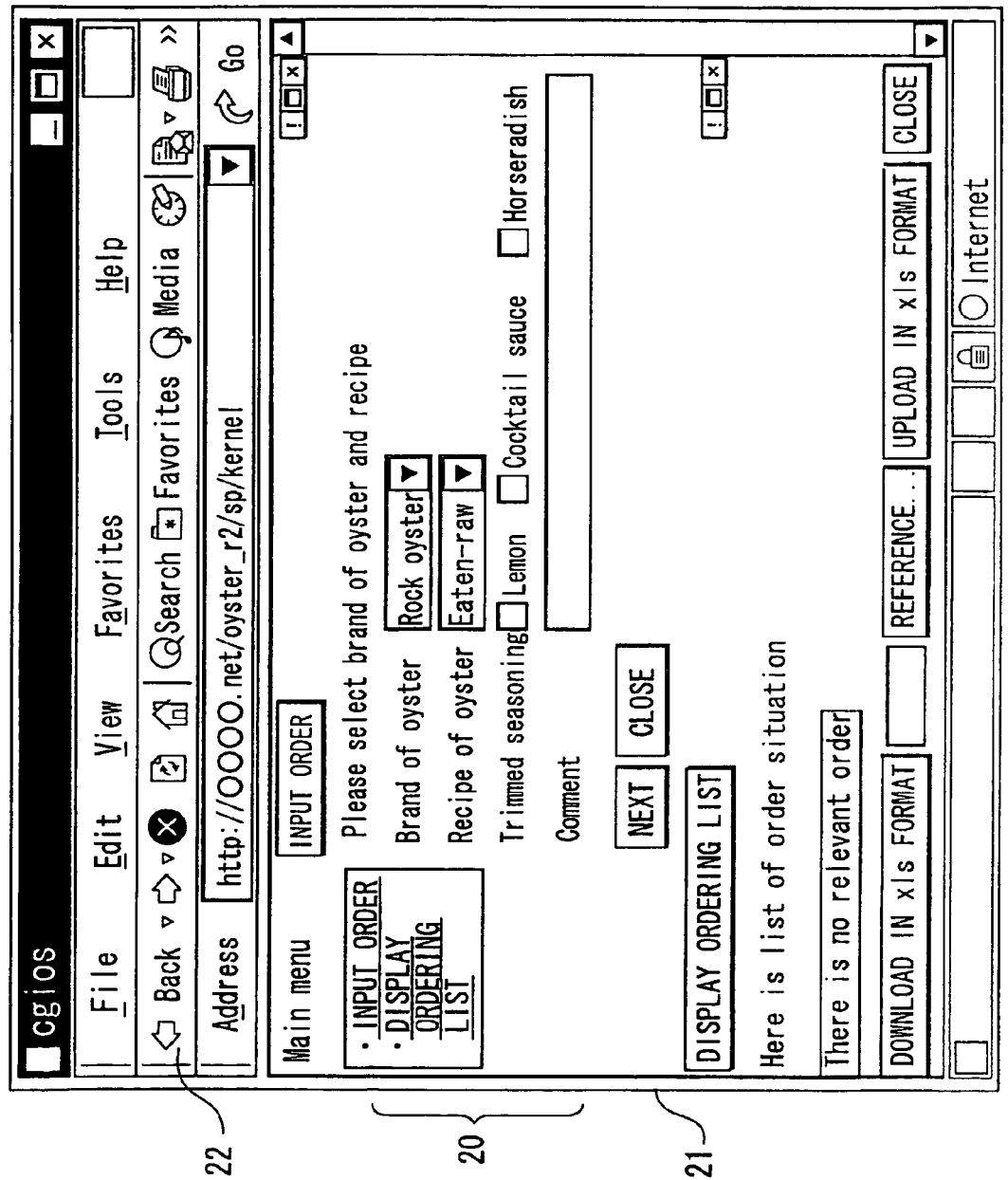
FIG. 18 is a diagram showing the display screen of the HTML document having the three windows.

When the menu stream program is executed to display menu display according to a page definition shown in FIG. 17(b) in the "menu" section of the windows and "INPUT ORDER" in the menu display is clicked, the stream program related to the ordering process of oyster dish is executed in the section "view" of the windows, and thereby the entry form related to the order of the oyster dish is created as shown in FIG. 18. Also, a stream program for executing display of a list of ordering is executed when "DISPLAY ORDERING LIST" is cricked in the menu display.

As described above, by utilizing the plurality of page definitions and the plurality of stream programs, it is possible to appropriately use the window for displaying the entry form or the like, according to the contents of the series of counter processes. Furthermore, since it is capable of carrying out the window management without depending upon the frame function of the browser of the client 7, it is possible to display the window display which the side of server 1 intends on the web page of the client 7.

Although the server according to the present invention is described, it is to be noted that the server according to the present invention is not limited to the one shown in the aforementioned embodiment of the invention. For example, although it is explained that the cgios 3 is the middleware operated on the OS in the embodiment of the present invention, it may be a support software (support program) implemented as an application for web server (for example, Apache etc.). Furthermore, it may also be recommendable that the cgios 3 itself is an operating system and the functions specific to the cgios may be implemented in the operating system.

In addition, the stream program does not necessarily have to be used when the server 1 performs processes by utilizing the function of the cgios 3. The server may be configured to store the setting items of the entry form sent to the client 7 into the storage portion 10 as the entry form ledger and to compare the setting items in the reply information returned from the client 7 with the setting items stored in the storage portion 10, so as to judge whether or not the kinds of the received setting items are the same as that, without using the stream program.

Figure 20:
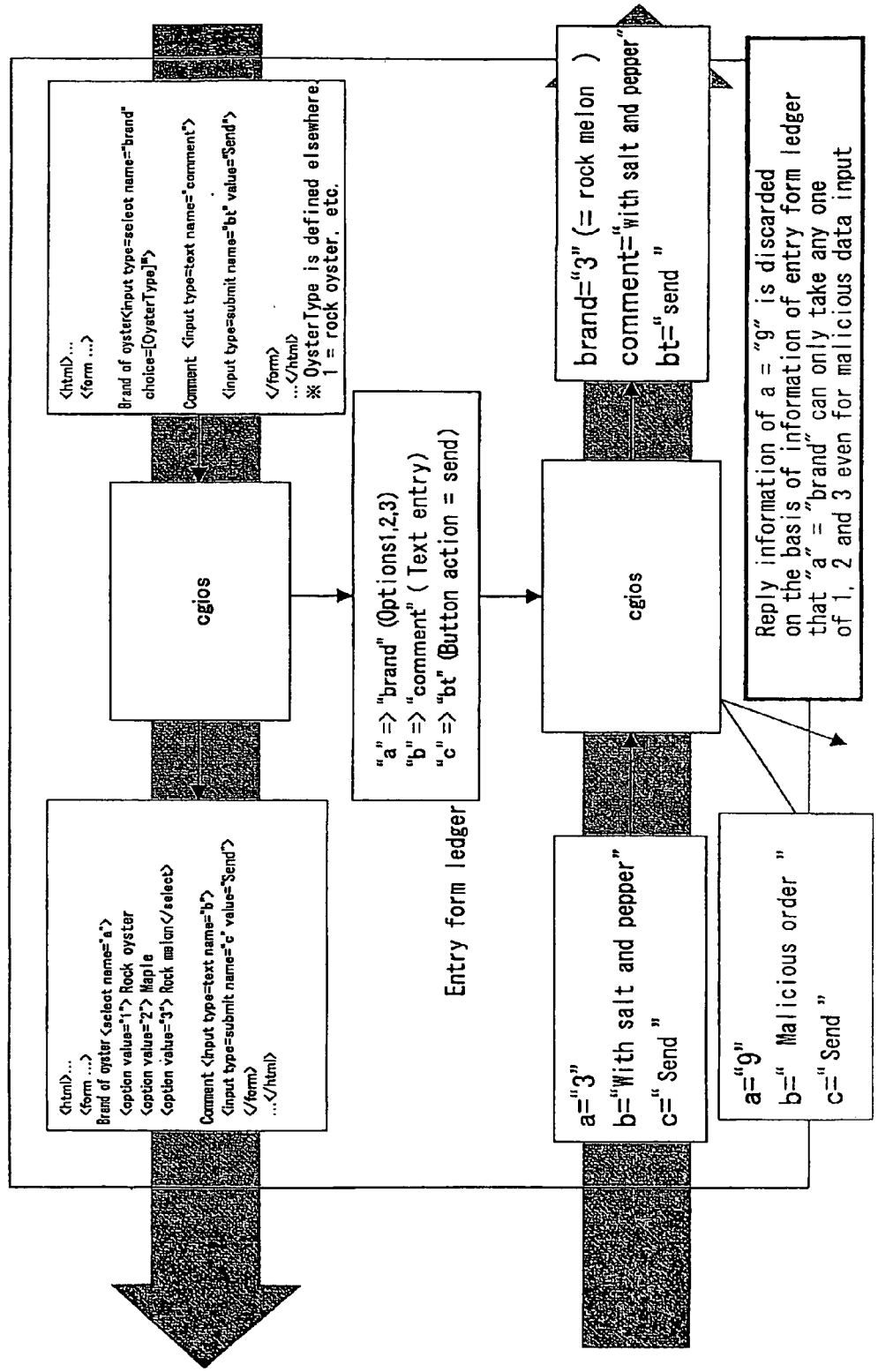
FIG. 20 is a diagram schematically showing a process of storing setting items into the storage portion, extracting corresponding setting items from reply information and storing them into the data-storage part, regardless of presence or absence of a stream program.

For example, as shown in FIG. 20, the controller 9 assigns a serial number of "a" to "c" to the setting items, to which the client 7 is possible to input in the entry form, respectively, and stores them into the storage portion 10 as the entry form ledger. At this time, the controller 9 defines data which is data related to the brand of oyster and which is data in a select format selected from numeric values of 1 to 3 as the data "a", defines data which is data related to the comment and which is in a text format as the data "b", and defines button action data which represents that a button placed in the HTML document sent to the client 7 is pressed as the data "c", and store them into the storage portion 10.

Then, the controller 9 receives the reply information returned from the client 7 to extract information corresponding to the data "a" to "c" from the reply information, and the kinds of setting items stored as the entry form ledger in the storage portion 10 are compared with the kinds of setting items of "a" to "c" of the reply information. When they correspond, data on the brand of oyster and the comment are stored in the data-storage part. The received reply information is discarded when they do not correspond. For example, in a case where a value of the data "a" included in the reply information is 9, the controller 9 judges that the data "a" is the data of the select format selected from the numeric values of 1 to 3 from the entry form ledger, and determines that the reply information in which the data "a" is 9 as irrelevant information and discards the reply information.

As described above, irrespective of presence or absence of the stream program, the server 1 stores the setting items of the entry form of the HTML document sent to the client 7 into the storage portion 10, and judges whether or not the setting items of the reply information received by the client 7 are same in kind with the setting items of the input data stored in the storage portion 10, so that it is possible to avoid the unexpected input data to be stored as the reply information into the data-storage part and used in a subsequent process.

Also, the server 1 may be configured to utilize the function of cgios 3 to process and change information of the entry form to be stored in the storage portion 10 such that data format thereof is processed and changed from data format suitable for the process in the server 1 to data format suitable for inputting data by the client 7 and then send it to the client 7, restore the returned reply information to the format before the process and the change are carried out, and thereafter execute the process in the server 1.

Figure 21:
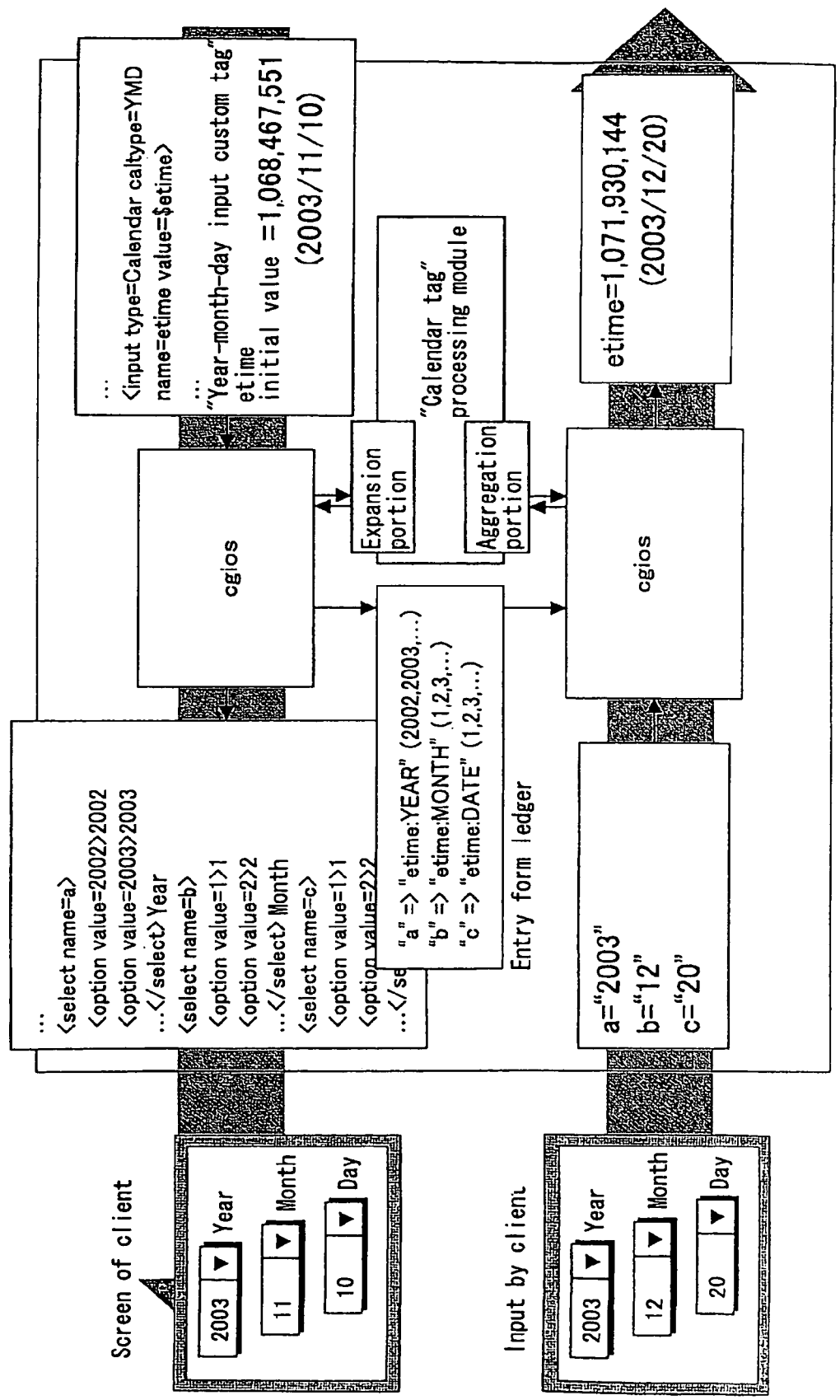
FIG. 21 is a diagram schematically showing a process of converting accumulated information into calendar-date information and storing it into the storage portion, extracting the corresponding calendar-date information from reply information and restoring it to the accumulated information, and storing the restored accumulated information into the data-storage part.
Figure 22:
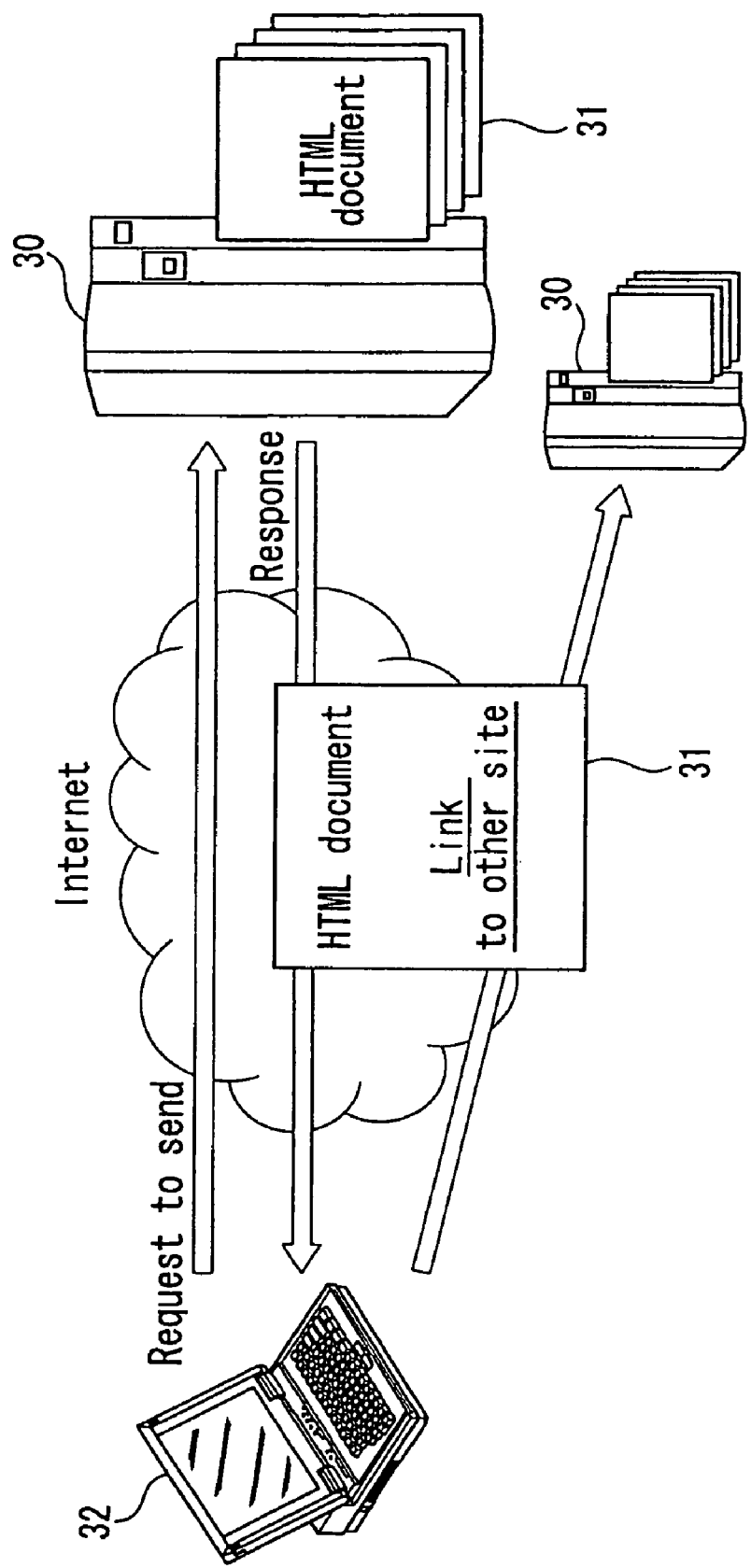
FIG. 22 is a diagram schematically showing a method of sending and receiving web information between a web server and a client.
Figure 23:
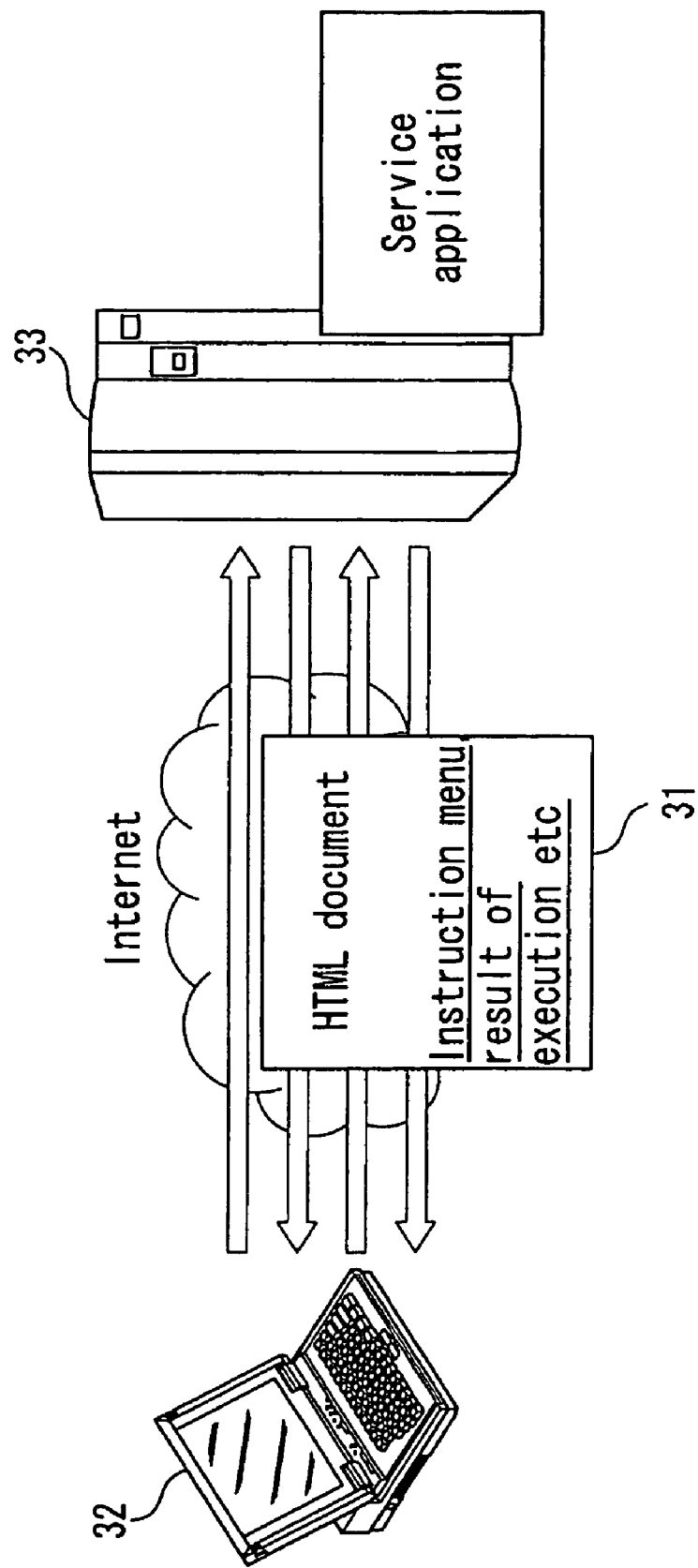
FIG. 23 is a diagram schematically showing a method of sending and receiving the web information between a conventional web application server and the client.
Figure 24:
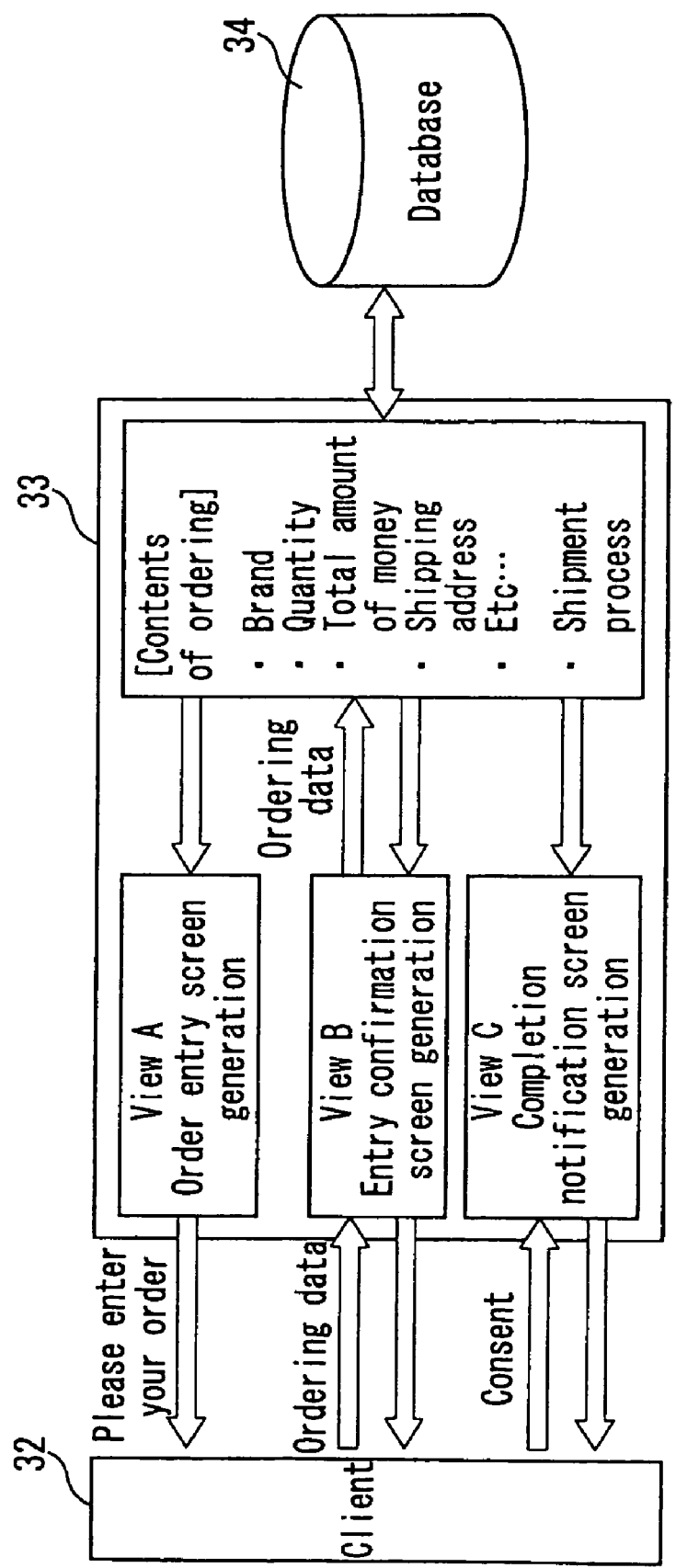
FIG. 24 is a diagram schematically showing a method of order placement process of goods between the web application server and the client.
Figure 25:
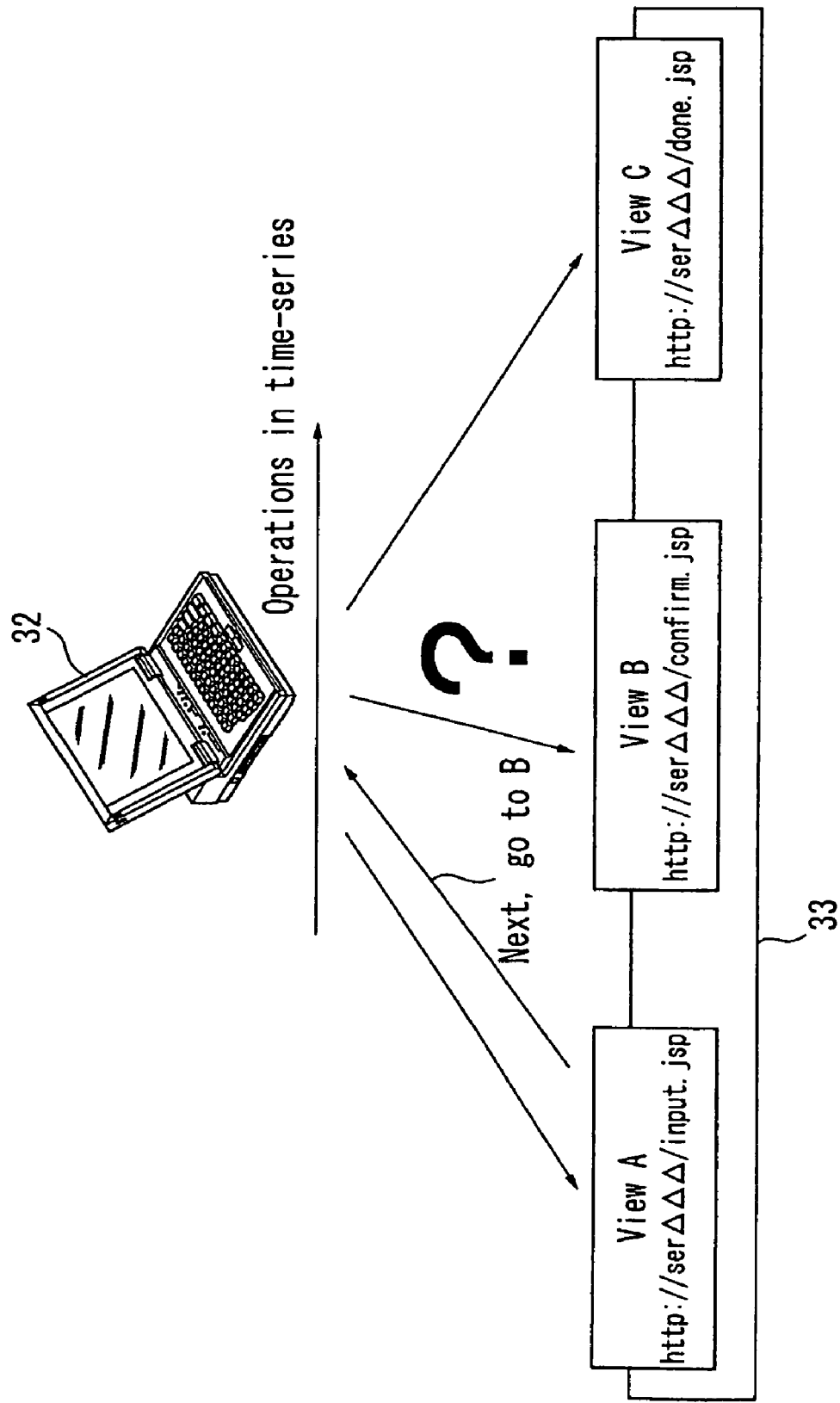
FIG. 25 is a diagram showing a case in which the client carries out a request of the web information to the web application server regardless of a flow of the order placement process.
Figure 26:
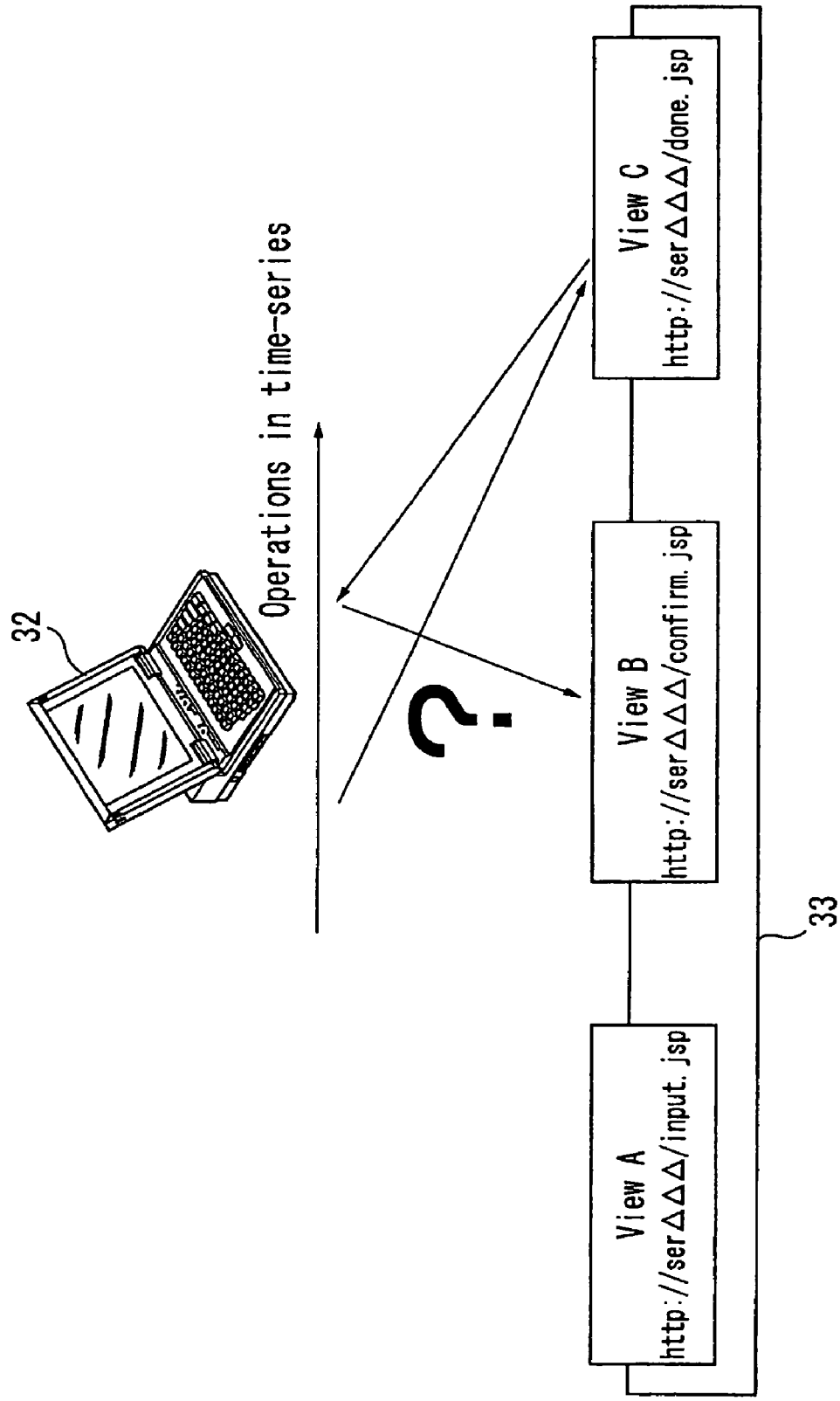
FIG. 26 is a diagram showing a case in which the client carries out the order placement process to the web application server twice.

For example, UNIX carries out general time management by using accumulated number of seconds from 0 hour 0 minute 0 second of Jan. 1, 1970. Accordingly, when making the client 7 to select "year", "month", "day" and "minute" separately in the entry form, the cgios 3 may utilize a "Calendar tag" processing module for carrying out conversion of date information shown by the accumulated number of seconds (hereinafter referred to as accumulated information) and date information represented by units such as "year", "month", "day" and "minute" (hereinafter referred to as calendar date information), to convert the accumulated information and the calendar date information. More specifically, as shown in FIG. 21, data which is related to "year" and in a select format selected from numeric values represented in the Christian year of 2000, 2001 . . . is defined as data "a", data which is related to "month" and in a select format selected from numeric values of 1 to 12 is defined as data "b", and data which is related to "day" and in a select format selected from numeric values of 1 to 31 is defined as data "c", and are stored in the storage portion 10, and then the HTML document to which the date information is added as the entry form is send to the client 7.

When the reply information is returned from the client 7, the server 1 judges whether the setting items of the data of "a", "b" and "c" from the received reply information are same in kind with the setting items of those stored in the storage portion 10, and discards the reply information when they differ, and when they are the same, utilizes the "Calendar tag" processing module of the cgios 3 to convert the calendar date information included in the reply information to the accumulated information, and stores it to the data-storage part.

As described above, the data format suitable for the process in the server 1 is converted into the data which corresponds to the setting items of the entry form, the converted data is stored in the storage portion 10 as the entry form ledger, the setting items of the reply information returned from the client 7 and the setting items stored in the storage portion 10 are compared, and the reply information is converted into the data format suitable for the process of the server 1 when the kinds of setting items correspond. Thereby, it is possible to use the data of the reply information in the data format suitable for the server 1, without necessity of the programmer to create a processing program of converting the input data included in the reply information.

Furthermore, when a checkbox is provided in the entry form, a setting item in which the checkbox is checked may be specified and a fact to the effect that the item is checked may be stored in the storage portion 10, in addition to the kind of setting item of the entry form.

More specifically, a checkbox field is provided in the HTML document which is to be sent to the client 7, the HTML document is created by setting the checkbox as previously checked, and the created HTML is sent to the client 7. At this time, other than the setting items of the entry form, the controller 9 associates the item among the setting items in which the checkbox is checked with data to the effect that the checkbox is set as already checked, and store it into the storage portion 10.

Then, the controller 9 compares the setting items of the reply information returned from the client 7 with the setting items of the entry form ledger, and judges whether or not information which corresponds to the setting item of the checkbox recorded in the entry form ledger as already checked is included in the reply information. Normally, the information related to the checkbox which is to be returned from the client 7 is included in the reply information when the checkbox is checked and is returned. However, it is not included therein when the checkbox is not checked (including a case in which the checkbox which is checked is changed to without check). Accordingly, the controller 9 judges whether or not the information related to the checked checkbox is included within the setting items of the returned reply information while referring to the information in the entry form ledger. When the information related to the checkbox recorded as already checked is not included in the reply information, the controller 9 judges that the client 7 has intentionally removed a check from the checkbox.

As described above, by having the storage portion 10 to store kind of setting item of the checkbox and the setting item of the checkbox set as already checked, it is possible to judge that the client 7 has intentionally removed the check in the case that the information related to the checkbox stored as already checked in the storage portion 10 is not included in the returned reply information. Therefore, it is possible to positively acquire information that the check is not done in the checkbox. Also, since there is no necessity of implementing the judgment of whether or not the check is removed from the checkbox with a program by utilizing the function of the cgios 3 for those judgments, it is possible to reduce the amount of work in creating and process of creating the programs.

The invention claimed is:

1. A server in which a controller sends web information to a client by using a communication unit, receives reply information with respect to said web information from said client via the communication unit, stores the reply information into a storage unit and executes processings based on said reply information according to processing steps of a series of said processings stored in said storage unit, characterized in that said controller executes:

information-adding processing for adding client-specifying information to specify said client and web-specifying information to specify said web information to the web information;

information-sending processing for sending said web information to which said client-specifying information and said web-specifying information are added to said client in a specified one of said processing steps by using said communication unit;

information-storing processing for storing said client-specifying information and said web-specifying information which are added to said web information and processing information related to said specified processing step at the time when said web information is sent to said client, into said storage unit every time said web information is sent to said client;

information-receiving processing for receiving the reply information returned from said client via said communication unit;

reply information-detecting processing for detecting whether or not the client-specifying information and the web-specifying information are included in the received reply information; and service-executing processing for obtaining a processing step subsequent to the processing step determined based on said processing information stored in said storage unit from said storage unit and executing the subsequent processing step when the client-specifying information and the web-specifying information are detected from said reply information and said detected client-specifying information and said web-specifying information are identical with said client-specifying information and said web-specifying information stored in said storage unit, respectively, and for executing the processing step determined based on said processing information stored in said storage unit again when the client-specifying information and the web-specifying information are detected from said reply information and said detected client-specifying information is identical with said client-specifying information stored in said storage unit but said web-specifying information detected from said reply information is different from said web-specifying information stored in said storage unit.

2. The server according to claim 1, characterized in that said storage unit comprises a data-declaration part to be used in said series of the processings as work areas for respective setting items of member variables and a data-storage part for storing data included in said reply information in said series of the processings for the respective setting items, and said controller:

discriminates, when a data entry form for having said client to input the data is included in said web information, a kind of a setting item of the input data to be inputted in said data entry form by said data-declaration part and stores the kind of the setting item of the input data into said storage unit together with said client-specifying information, said web-specifying information and said processing information in said information-storing processing at the time when the web information is sent to said client; and stores, when the client-specifying information and the web-specifying information detected from said reply information are identical with said client-specifying information and said web-specifying information stored in said storage unit, respectively, and the kind of the setting item of the input data detected from said reply information is identical with the kind of the setting item of the input data stored in said storage unit, said detected input data into said data-storage part for the respective setting items in said service-executing processing.

* * * * *